(12) United States Patent
Wartofsky

(10) Patent No.: US 11,170,653 B2
(45) Date of Patent: Nov. 9, 2021

(54) AUTOMATED AIR-TRAFFIC ADVISORY SYSTEM AND METHOD

(71) Applicant: Potomac Aviation Technology Corp., Boston, MA (US)

(72) Inventor: David Wartofsky, Accokeek, MD (US)

(73) Assignee: POTOMAC AVIATION TECHNOLOGY CORP., Boston, MA (US)

( * ) Notice: Subject to any disclaimer, the term of this patent is extended or adjusted under 35 U.S.C. 154(b) by 154 days.

(21) Appl. No.: 16/528,811

(22) Filed: Aug. 1, 2019

(65) Prior Publication Data

US 2020/0043347 A1    Feb. 6, 2020

Related U.S. Application Data

(60) Provisional application No. 62/713,267, filed on Aug. 1, 2018.

(51) Int. Cl.
  *G08G 5/00* (2006.01)
  *G08G 7/00* (2006.01)
  *H04B 7/185* (2006.01)

(52) U.S. Cl.
  CPC .............. *G08G 5/0008* (2013.01); *G08G 5/00* (2013.01); *G08G 5/0013* (2013.01); *G08G 5/0021* (2013.01); *G08G 5/0082* (2013.01); *G08G 7/00* (2013.01); *H04B 7/18506* (2013.01)

(58) Field of Classification Search
  CPC .......... G08G 5/0008; G08G 7/00; G08G 5/00; G08G 5/0082; G08G 5/0021; G08G 5/0013; G08G 5/0091; G08G 5/0026; H04B 7/18506
  See application file for complete search history.

(56) References Cited

U.S. PATENT DOCUMENTS

| | | | |
|---|---|---|---|
| 5,153,836 A * | 10/1992 | Fraughton | G01S 5/0009 340/961 |
| 6,380,869 B1 | 4/2002 | Simon et al. | |
| 6,552,669 B2 | 4/2003 | Simon et al. | |
| 2002/0063653 A1 * | 5/2002 | Oey | G01S 13/933 342/29 |
| 2019/0137997 A1 * | 5/2019 | Sterling | G05D 1/0027 |

* cited by examiner

*Primary Examiner* — Phuong H Nguyen
(74) *Attorney, Agent, or Firm* — Hamilton, Brook, Smith & Reynolds, P.C.

(57) ABSTRACT

An automated air traffic advisory system bridges the communications gap between multiple aircraft on different frequencies in a monitored airspace, such as a non-towered airport, that may be remote from an Air Traffic Control facility. The system can automatically notify remote Air Traffic Control of the status of an aircraft in the monitored airspace, and can dynamically vary transmitter strength to be heard selectively only by nearby aircraft.

55 Claims, 18 Drawing Sheets

AUTOMATED AIR-TRAFFIC ADVISORY SYSTEM AND METHOD

RELATED APPLICATION

This application claims the benefit of U.S. Provisional Application No. 62/713,267, filed on Aug. 1, 2018. The entire teachings of the above application are incorporated herein by reference.

BACKGROUND

Airliners, corporate flights and charter flights operate under Instrument Flight Rules (IFR), regardless of weather. In the weather, nothing can be seen, so the aircraft rely on Air Traffic Control (ATC) for separation and flow control. An air traffic controller cannot allow the next aircraft into airspace they control until they can confirm that the path is clear and safe. In many locations, surveillance radar is not available. For example, currently, in Outer Banks, N.C., below an altitude of 6,000 feet, an aircraft disappears from radar. Instrument Flight Rules (IFR) air traffic control is a series of handoffs from one air traffic controller to the next.

There are currently about 100,000 airports worldwide. About 2,000 of those are major airports, with heavy airline operations and control towers; about 3,000 of them are regional airports, with intermittent scheduled airline operations, such as commuter airline operations, and with a tower, often part-time; and about 95,000 of them are non-towered airports. The 95,000 airports without towers are of limited use without the ability for IFR aircraft, such as commercial airline, corporate and charter flights, to reach those non-towered airports conveniently and safely. Non-towered airports have the highest mid-air collision and near miss rates. IFR operations are greatly slowed when the distant ATC control facility cannot determine the status of IFR aircraft at a remote airport. IFR aircraft and local area Visual Flight Rules (VFR) traffic communicate on different Very High Frequency (VHF) radio frequencies, and so are constantly startled to discover each other. A jet inbound to an airport along an IFR procedure may suddenly discover that there is a large amount of local area VFR air traffic, which may even be using the opposite runway from the inbound jet. Meanwhile, the local VFR air traffic may be suddenly confronted by a fast-moving incoming jet on an IFR approach path, which is not communicating with any of the local VFR air traffic. Often a remote air traffic control approach controller has no idea what is going on at the remote airport to which they are clearing an IFR aircraft.

There is, therefore, an ongoing need to improve air traffic control, particularly for non-towered airports.

SUMMARY

In accordance with an embodiment of the invention, an automated air traffic advisory system bridges the communications gap between multiple aircraft on different frequencies in a monitored airspace, such as a non-towered airport, that may be remote from an Air Traffic Control facility. The system can automatically notify remote Air Traffic Control of the status of an aircraft in the monitored airspace, and can dynamically vary transmitter strength to be heard selectively only by nearby aircraft. Other related embodiments are taught herein.

In one embodiment according to the invention, there is provided a method of automatically communicating air-traffic advisory messages. The method comprises, based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, automatically communicating at least one air-traffic advisory message. The automatically communicating the at least one air-traffic advisory message comprises one or more of: (i) on the first communications frequency, automatically communicating to the at least one first aircraft a message comprising an alert regarding the at least one second aircraft in the monitored airspace; and (ii) on the second communications frequency, automatically communicating to the at least one second aircraft a message comprising an alert regarding the at least one first aircraft in the monitored airspace.

In further, related embodiments, the method may further comprise: receiving, with at least one monitoring processor, real-time aircraft traffic data for the plurality of aircraft in the monitored airspace; based on at least the real-time aircraft traffic data, determining with the at least one monitoring processor the presence of the at least one first aircraft of the plurality of aircraft configured for communicating on the first communications frequency; and based on at least the real-time aircraft traffic data, determining with the at least one monitoring processor the presence of the at least one second aircraft of the plurality of aircraft configured for communicating on the second communications frequency. The method may further comprise receiving a communication of the presence of the at least one first aircraft and of the presence of the at least one second aircraft. Receiving the communication of the presence of the at least one first aircraft and of the presence of the at least one second aircraft may comprise one or more of: (i) receiving a message from a cloud-based application; and (ii) receiving a message from an Aircraft Communications Addressing and Reporting System (ACARS). The at least one first aircraft may comprise an aircraft operating on Visual Flight Rules (VFR) in the monitored airspace. The at least one second aircraft may comprise an aircraft operating on Instrument Flight Rules (IFR) in the monitored airspace. The automatically communicating the at least one air-traffic advisory message may comprise both: (i) on the first communications frequency, automatically communicating to the at least one first aircraft a message comprising an alert regarding the at least one second aircraft in the monitored airspace; and (ii) on the second communications frequency, automatically communicating to the at least one second aircraft a message comprising an alert regarding the at least one first aircraft in the monitored airspace. The method may comprise receiving, with at least one monitoring processor, real-time aircraft traffic data for the plurality of aircraft in the monitored airspace, and the real-time aircraft traffic data may comprise at least one of: a call sign, a latitude and longitude, an altitude, a bearing and a speed, of at least one aircraft of the plurality of aircraft in the monitored airspace. The real-time aircraft traffic data may comprise data broadcast from the at least one aircraft of the plurality of aircraft in the monitored airspace; and may comprise Automatic Dependent Surveillance-Broadcast (ADS-B) data.

In other related embodiments, the method may comprise determining the presence of the at least one first aircraft, and the determining may comprise determining a presence of a greater number of the at least one first aircraft operating on Visual Flight Rules (VFR) in the monitored airspace than a predetermined Visual Flight Rules (VFR) traffic threshold. The method may comprise determining the presence of the at least one second aircraft, and the determining may comprise determining a presence of the at least one second aircraft on an Instrument Flight Rules (IFR) approach path in the monitored airspace. The automatically communicating the at least one air-traffic advisory message may comprise one or more of: (i) on the first communications frequency, automatically communicating to the at least one first aircraft a message comprising an alert regarding the at least one second aircraft in the monitored airspace being an approaching Instrument Flight Rules (IFR) aircraft, wherein the at least one first aircraft comprises one or more aircraft operating on Visual Flight Rules (VFR) in the monitored airspace; and (ii) on the second communications frequency, automatically communicating to the at least one second aircraft a message comprising an alert regarding the at least one first aircraft in the monitored airspace being one or more aircraft operating on Visual Flight Rules (VFR) in the monitored airspace, wherein the at least one second aircraft comprises one or more aircraft operating on Instrument Flight Rules (IFR) in the monitored airspace.

In further, related embodiments, the monitored airspace may comprise a non-towered airport. The at least one second aircraft may comprise one or more aircraft operating on Instrument Flight Rules (IFR) in the monitored airspace, in communication with Air Traffic Control (ATC) at a remote location, outside the monitored airspace. The automatically communicating the at least one air-traffic advisory message may comprise communicating on an air traffic frequency that is assigned for use of aircraft communications at a remote location, which is out of effective radio range of the monitored airspace, using a transmission power for the automatically communicating that is sufficiently low in power to avoid receipt of the at least one air-traffic advisory message at the remote location but sufficiently high in power to permit receipt of the at least one air-traffic advisory message in the monitored airspace. The air traffic frequency that is assigned for the use of aircraft communications at a remote location may comprise a Common Traffic Advisory Frequency (CTAF).

In another embodiment according to the invention, there is provided a method of automatically communicating with a remote Air Traffic Control (ATC) location. The method comprises, based on a flight status of at least one aircraft operating under Instrument Flight Rules (IFR) in a monitored airspace, located remotely from the Air Traffic Control (ATC) location, automatically communicating a message for use of the remote Air Traffic Control (ATC) indicating the flight status of the at least one aircraft operating under Instrument Flight Rules (IFR).

In further, related embodiments, the method may comprise receiving, with at least one monitoring processor, real-time aircraft traffic data for a plurality of aircraft in the monitored airspace; and, based on at least the real-time aircraft traffic data, determining a flight status of the at least one aircraft operating under Instrument Flight Rules (IFR) in the monitored airspace and being assigned to be controlled by the remotely located Air Traffic Control (ATC) location. The method may comprise receiving a communication of the flight status of the at least one aircraft operating under Instrument Flight Rules (IFR) in the monitored airspace and being assigned to be controlled by the remotely located Air Traffic Control (ATC) location. Receiving the communication of the presence of the at least one aircraft operating under Instrument Flight Rules (IFR) in the monitored airspace may comprise one or more of: (i) receiving a message from a cloud-based application; and (ii) receiving a message from an Aircraft Communications Addressing and Reporting System (ACARS). The monitored airspace may comprise a non-towered airport; and the flight status may comprise at least one of: a landed status, a gone around status, a departed status, and an off-runway status. The method may comprise at least one of: transmitting a satellite message, and generating an automatic telecommunications message. The automatically communicating may comprise transmitting a message for use of at least one of Air Traffic approach control and Air Traffic departure control at the Air Traffic Control (ATC) location. The automatically communicating may comprise transmitting a message for use of a cloud-based application.

In another embodiment according to the invention, there is provided a system for automatically communicating air-traffic advisory messages. The system comprises at least one communications processor adapted to, based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, automatically generate at least one air-traffic advisory message comprising one or more of: a first message to the at least one first aircraft comprising an alert regarding the at least one second aircraft in the monitored airspace; and a second message to the at least one second aircraft comprising an alert regarding the at least one first aircraft.

In further related embodiments, the system may further comprise at least one monitoring processor adapted to receive real-time aircraft traffic data for the plurality of aircraft in the monitored airspace; the at least one monitoring processor being adapted to determine, based on at least the real-time aircraft traffic data, the presence of the at least one first aircraft of the plurality of aircraft configured for communicating on the first communications frequency; and the at least one monitoring processor being further adapted to determine, based on at least the real-time aircraft traffic data, the presence of the at least one second aircraft of the plurality of aircraft configured for communicating on the second communications frequency, different from the first communications frequency. The system may further comprise at least one monitoring processor adapted to receive a communication of the presence of the at least one first aircraft and of the presence of the at least one second aircraft. The at least one monitoring processor may be adapted to receive the communication of the presence of the at least one first aircraft and of the presence of the at least one second aircraft by one or more of: (i) receiving a message from a cloud-based application; and (ii) receiving a message from an Aircraft Communications Addressing and Reporting System (ACARS). The system may further comprise at least one transmitter in communication with the at least one communications processor adapted to perform at least one of: (i) on the first communications frequency, automatically communicate the first message to the at least one first aircraft; and (ii) on the second communications frequency, automatically communicate the second message to the at least one second aircraft. The at least one first aircraft may comprise an aircraft operating on Visual Flight Rules (VFR) in the monitored airspace. The at least one second aircraft may comprise an aircraft operating on Instrument Flight Rules (IFR) in the monitored airspace. The system may comprise a monitoring processor adapted to receive real-time aircraft traffic data for the plurality of aircraft in the monitored airspace, wherein the real-time aircraft traffic data comprises at least one of: a call sign, a latitude and longitude, an altitude, a bearing and a speed, of at least one aircraft of the plurality of aircraft in the monitored airspace. The real-time aircraft traffic data may comprise data broadcast from the at least one aircraft of the plurality of aircraft in the monitored airspace; and may comprise Automatic Dependent Surveillance-Broadcast (ADS-B) data.

In other related embodiments, the system may further comprise at least one monitoring processor adapted to determine a presence of a greater number of the at least one first aircraft operating on Visual Flight Rules (VFR) in the monitored airspace than a predetermined Visual Flight Rules (VFR) traffic threshold. The system may further comprise at least one monitoring processor adapted to determine a presence of the at least one second aircraft on an Instrument Flight Rules (IFR) approach path in the monitored airspace. The at least one communications processor may be further adapted to generate at least one air-traffic advisory message comprising one or more of: (i) an alert regarding the at least one second aircraft in the monitored airspace being an approaching Instrument Flight Rules (IFR) aircraft, wherein the at least one first aircraft comprises one or more aircraft operating on Visual Flight Rules (VFR) in the monitored airspace; and (ii) an alert regarding the at least one first aircraft in the monitored airspace being one or more aircraft operating on Visual Flight Rules (VFR) in the monitored airspace, wherein the at least one second aircraft comprises one or more aircraft operating on Instrument Flight Rules (IFR) in the monitored airspace.

In further related system embodiments, the monitored airspace may comprise a non-towered airport. The at least one second aircraft may comprise one or more aircraft operating on Instrument Flight Rules (IFR) in the monitored airspace, in communication with Air Traffic Control (ATC) at a remote location, outside the monitored airspace. The system may further comprise at least one transmitter in communication with the at least one communications processor adapted to perform at least one of: (i) on the first communications frequency, automatically communicating the first message to the at least one first aircraft; and (ii) on the second communications frequency, automatically communicating the second message to the at least one second aircraft; and the at least one transmitter may be further adapted to communicate on an air traffic frequency that is assigned for use of aircraft communications at a remote location, which is out of effective radio range of the monitored airspace, using a transmission power for the automatically communicating that is sufficiently low in power to avoid receipt of the at least one air-traffic advisory message at the remote location but sufficiently high in power to permit receipt of the at least one air-traffic advisory message in the monitored airspace. The air traffic frequency that is assigned for the use of aircraft communications at a remote location may comprise a Common Traffic Advisory Frequency (CTAF).

In another embodiment according to the invention, there is provided a system for automatically communicating with a remote Air Traffic Control (ATC) location. The system comprises at least one communications processor adapted to, based on a flight status of at least one aircraft operating under Instrument Flight Rules (IFR) in a monitored airspace, located remotely from the Air Traffic Control (ATC) location, automatically generate a message for use of the remote Air Traffic Control (ATC) indicating the flight status of the at least one aircraft operating under Instrument Flight Rules (IFR).

In further related embodiments, the system may further comprise at least one monitoring processor adapted to receive real-time aircraft traffic data for the plurality of aircraft in the monitored airspace, located remotely from the Air Traffic Control (ATC) location; the at least one monitoring processor adapted to, based on at least the real-time aircraft traffic data, determine the flight status of at least one aircraft operating under Instrument Flight Rules (IFR) in the monitored airspace and being assigned to be controlled by the remotely located Air Traffic Control (ATC) location. The system may further comprise at least one monitoring processor adapted to receive a communication of the flight status of the at least one aircraft operating under Instrument Flight Rules (IFR) in the monitored airspace and being assigned to be controlled by the remotely located Air Traffic Control (ATC) location. The at least one monitoring processor may be adapted to receive the communication of the presence of the at least one aircraft operating under Instrument Flight Rules (IFR) in the monitored airspace by one or more of: (i) receiving a message from a cloud-based application; and (ii) receiving a message from an Aircraft Communications Addressing and Reporting System (ACARS). The system may further comprise a transmitter configured to communicate the message for use of the remote Air Traffic Control (ATC). The monitored airspace may comprise a non-towered airport. The flight status may comprise at least one of: a landed status, a gone around status, a departed status, and an off-runway status. The system may further comprise a transmitter configured to communicate the message for use of the remote Air Traffic Control (ATC), and the transmitter may be further adapted to transmit at least one of a satellite message and an automatic telecommunications message. The transmitter may be further adapted to transmit a message for use of at least one of Air Traffic approach control and Air Traffic departure control at the Air Traffic Control (ATC) location. The transmitter may be further adapted to transmit a message for use of a cloud-based application.

In another embodiment according to the invention, there is provided a non-transitory computer-readable medium configured to store instructions for automatically communicating air-traffic advisory messages. The instructions, when loaded and executed by a processor, cause the processor to automatically communicate air-traffic advisory messages by: based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, automatically communicating at least one air-traffic advisory message, the automatically communicating the at least one air-traffic advisory message comprising one or more of: (i) on the first communications frequency, automatically communicating to the at least one first aircraft a message comprising an alert regarding the at least one second aircraft in the monitored airspace; and (ii) on the second communications frequency, automatically communicating to the at least one second aircraft a message comprising an alert regarding the at least one first aircraft in the monitored airspace.

In another embodiment according to the invention, there is provided a non-transitory computer-readable medium configured to store instructions for communicating with a remote Air Traffic Control (ATC) location. The instructions, when loaded and executed by a processor, cause the processor to communicate with a remote Air Traffic Control (ATC) location by: based on a flight status of at least one aircraft operating under Instrument Flight Rules (IFR) in a monitored airspace, located remotely from the Air Traffic Control (ATC) location, automatically communicating a message for use of the remote Air Traffic Control (ATC) indicating the flight status of the at least one aircraft operating under Instrument Flight Rules (IFR).

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In accordance with an embodiment of the invention, an automated air traffic advisory system bridges the communications gap between multiple aircraft on different frequencies in a monitored airspace, such as a non-towered airport, that may be remote from an Air Traffic Control facility. The system can automatically notify remote Air Traffic Control of the status of an aircraft in the monitored airspace, and can dynamically vary transmitter strength to be heard selectively only by nearby aircraft.

Figure 1:
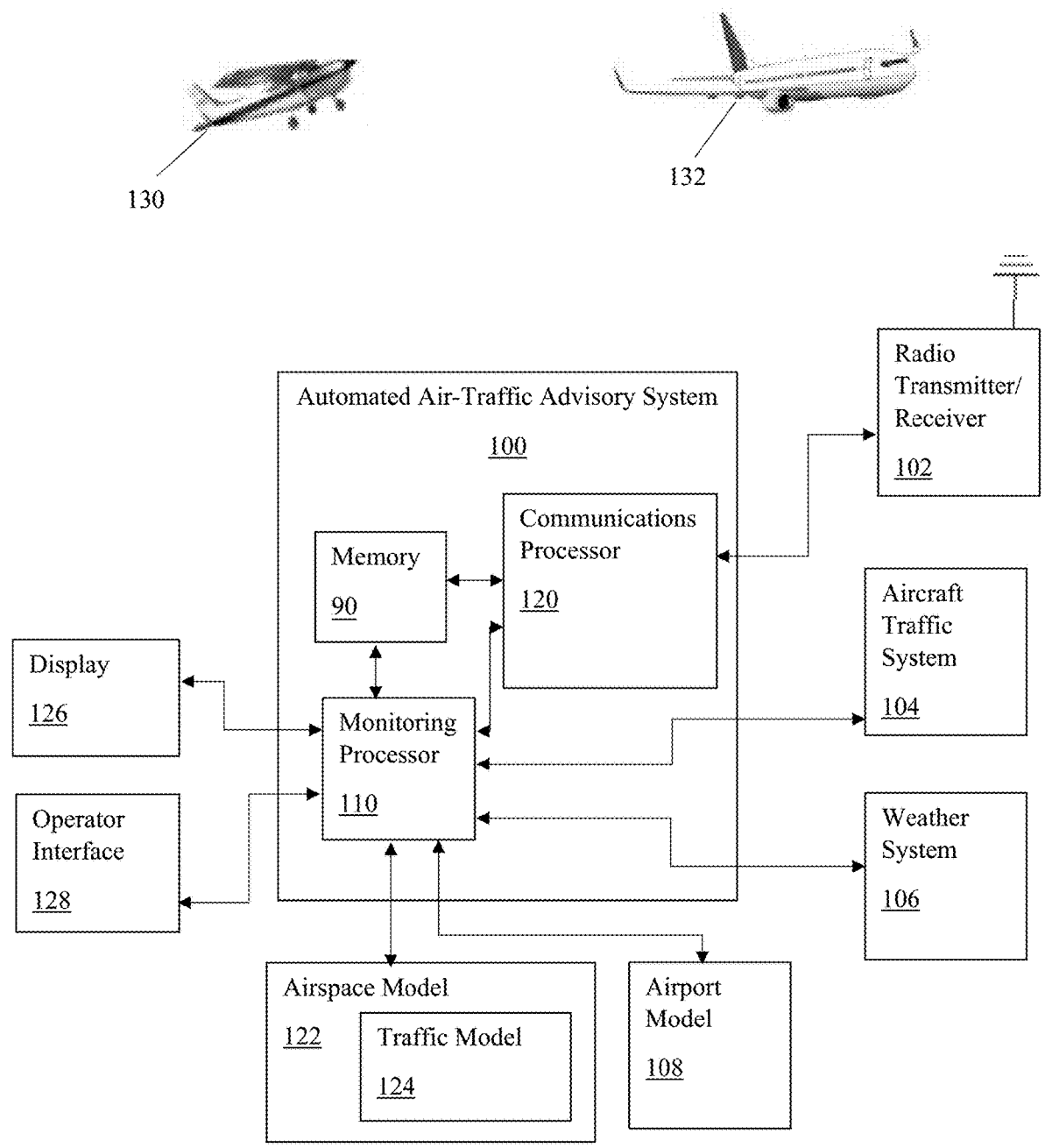
FIG. 1 is a schematic diagram of an automated air-traffic advisory system and related components, in accordance with an embodiment of the invention.

FIG. 1 is a schematic diagram of an automated air-traffic advisory system 100 and related components, in accordance with an embodiment of the invention. The automated air-traffic advisory system 100 automatically communicates air-traffic advisory messages. The system 100 comprises a monitoring processor 110 that is adapted to receive real-time aircraft traffic data for a plurality of aircraft 130, 132 in a monitored airspace, for example a non-towered airport. Based on the real-time aircraft traffic data, the monitoring processor 110 is adapted to determine the presence of one or more first aircraft 130 that is likely configured for communicating on a first communications frequency. For example, the first aircraft 130 may be an aircraft operating under Visual Flight Rules (VFR) and communicating on a first communications frequency that is used by VFR aircraft in the area. Based on the real-time aircraft traffic data, the monitoring processor 110 is also adapted to determine the presence of one or more second aircraft 132 that is likely configured for communicating on a second communications frequency, different from the first communications frequency. For example, the second aircraft 132 may be an aircraft operating under Instrument Flight Rules (IFR) and communicating on a second communications frequency, different from the first frequency, and which is used by IFR aircraft communicating with a remote air traffic control (ATC) location. In another embodiment, as discussed further below, the monitoring processor 110 is configured to receive data from an external source regarding aircraft in the monitored airspace, such as the first aircraft 130 and the second aircraft 132, as an alternative to, or in addition to, determining data about such aircraft itself, such as the presence and communications frequencies of such aircraft. Based on determining the presence of the first aircraft 130 and the second aircraft 132, or receiving that data from an external source, or both, one or more communications processor 120 is adapted to automatically generate one or more air-traffic advisory messages, which are either or both: (i) a first message to the first aircraft 130 comprising an alert regarding the second aircraft 132 in the monitored airspace, and (ii) a second message to the second aircraft 132 comprising an alert regarding the first aircraft 130. In this way, each of the two aircraft, operating on different communications frequencies, can be alerted of each other's presence and intentions, thereby promoting safety and ease of use of the monitored airspace by both types of aircraft at the same time. For example, the use of non-towered airports by VFR and IFR aircraft alike can be encouraged and made safer and more convenient.

As is also shown in the embodiment of FIG. 1, the automated air-traffic advisory system 100 includes a memory 90, which includes instructions and storage necessary for implementing the monitoring processor 110, communications processor 120 and other components, as discussed further relative to FIGS. 16 and 17, below. A display 126 and operator interface 128 may also be operatively connected with the system 100. The communications processor 120 is in electronic communication with a radio transmitter/receiver 102, which sends radio communications to the aircraft 130 and 132. Forms of communication other than radio can also be used, as discussed further herein. The monitoring processor 110 is in communication with an aircraft traffic system 104 and a weather system 106, an airspace model 122 and an airport model 108. Functioning of these components can include similar features to those described in U.S. Pat. No. 6,552,669 B2 of Simon et al., the teachings of which are hereby incorporated herein by reference in their entirety. Briefly, the aircraft traffic system 104 is a commercially available device that monitors transponders, usually located on an aircraft 130, 132, that transmit digitally encoded aircraft and vehicle identification information over a radio frequency channel. After retrieved transponder data are compiled and reformatted by the aircraft traffic system 104, they are transferred to the monitoring processor 110, which uses the data to update records in an airspace model 122. The aircraft traffic system 104 can, for example, be a Traffic Collision and Detection (TCAD) system or an Automatic Dependent Surveillance-Broadcast (ADS-B) system. Alternatively, or in addition, the monitoring processor 110 can receive information on the aircraft in the monitored airspace from another external source, for example via a message from a cloud-based application or an Aircraft Communications Addressing and Reporting System (ACARS), as discussed in connection with FIG. 2. The weather system 106 (of FIG. 1) provides relevant air traffic weather data, which, once retrieved by the monitoring processor 110, is stored in the appropriate mathematical model in airspace model 122. It will be appreciated that both airspace model 122 and airport model 108 can, for example, be implemented as one or more processors and memories containing digitally-stored data implementing those models 122 and 108.

The monitoring processor 110 reviews and updates information stored in mathematical models to generate accurate and relevant pilot advisories. Two such mathematical models stored in the automated air-traffic advisory system are airport model 122 and airspace model 108, which are comprised of relevant air traffic control information. Within airspace model 122 is a traffic model 124 where records are maintained about aircraft location and associated trajectories, that is, dynamic aspects of the monitored airspace. Static aspects of the monitored airspace are recorded in airport model 108. This model is tailored to reflect the physical attributes of a particular airport, since every airport has its own unique geographical signature. The geographical features in the airport model 108 are generally static over time and, once programmed, need relatively few updates. Recorded attributes include aspects such as angle of runway, type of runway (such as asphalt or dirt), approach/depart procedures, headings and airport procedures.

Figure 13:
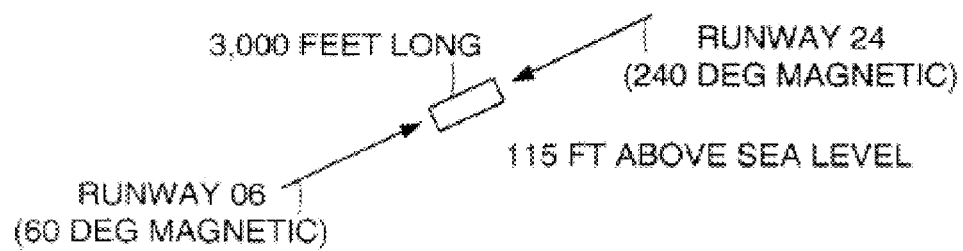
FIG. 13 is a schematic diagram illustrating some of the physical features of an airport model, which is used in accordance with an embodiment of the invention.

FIG. 13 is a schematic diagram illustrating a sample runway and some of the physical features of an airport model 108, which is used in accordance with an embodiment of the invention. In this example, "runway 06" heading at 60° magnetic is 3,000 feet long and 115 feet above sea level. "Runway 24" has a heading of 240° magnetic, and is also 3,000 feet long.

Returning to the embodiment of FIG. 1, dynamic aspects of the airspace are monitored and recorded in an airspace model 122, which is constantly updated with fresh data. Examples of monitored dynamic attributes include aircraft location information, flight patterns, weather conditions, communications channel traffic, such as Common Traffic Advisory Frequency (CTAF) channel traffic, and other relevant air traffic data and procedures.

Figure 14A:
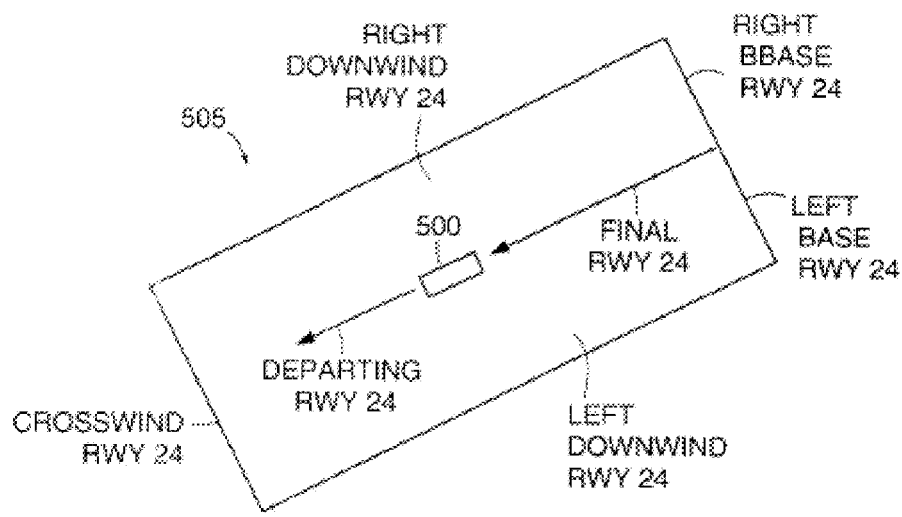
FIG. 14A is an example of an air traffic pattern within an airspace model that is used in accordance with an embodiment of the invention.
Figure 14B:
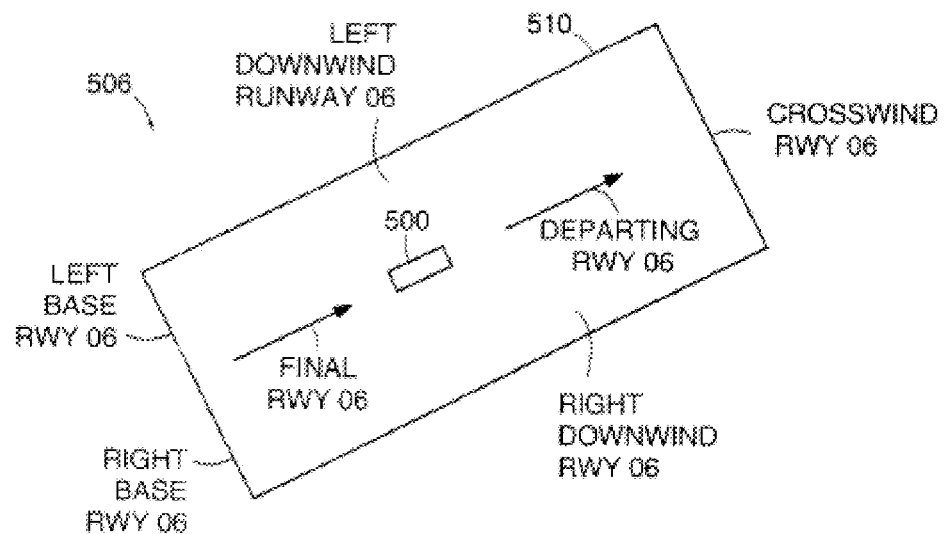
FIG. 14B is an example of another air traffic pattern within an airspace model that is used in accordance with an embodiment of the invention.

FIGS. 14A and 14B show examples of two air traffic patterns 505, 506 and associated terminology for each flight leg 510. The traffic patterns 505 and 506 are stored in airspace model 122 and are activated depending on wind direction. Specifically, traffic pattern 506 in FIG. 14A shows "runway 24" 500, left and right base runway 24, crosswind runway 24, along with right and left downwind runway 24. As illustrated in FIG. 14B, similar attributes are stored in the airspace model 122 for "runways 06" 500.

Returning to FIG. 1, the traffic model 124 within airspace model 122 tracks target aircraft in the monitored airspace.

Figure 15A:
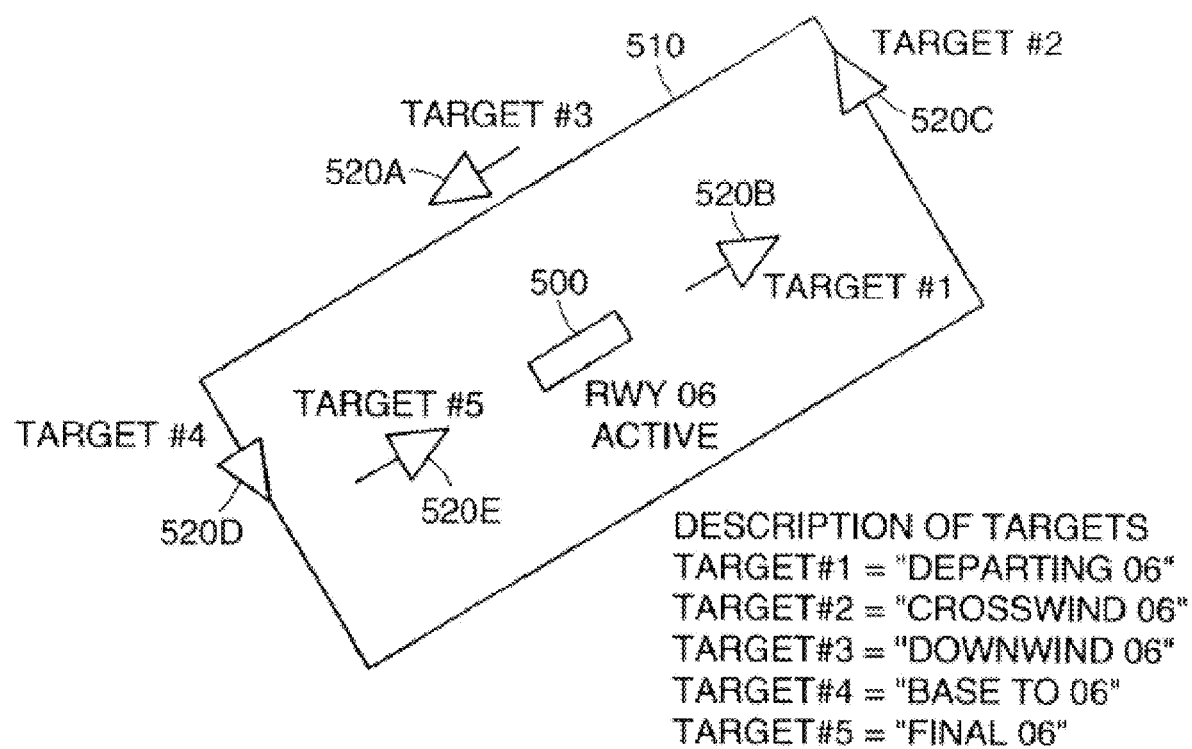
FIG. 15A is an example of tracked targets within an airspace model that is used in accordance with an embodiment of the invention.

FIG. 15A illustrates the terminology used by the system to address tracked aircraft in the monitored air space. Specifically, relative to the active runway "runway zero-six" 500, target #1 520B is addressed as "departing zero-six," target #2 520C flying transversely to runway 500 is addressed as "crosswind zero-six." Target #3 520A is addressed as "downwind zero-six." Target #4 520D is addressed as "base to zero-six." Finally, target #5 520E is addressed as "final zero-six."

Figure 15B:
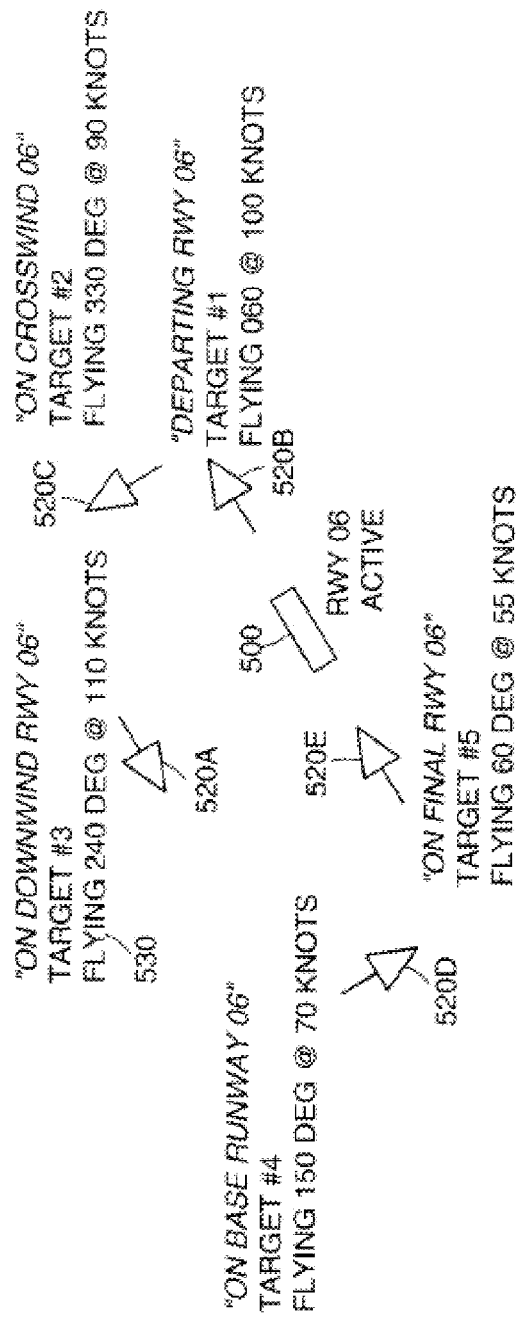
FIG. 15B is an example of descriptive terminology associated with tracked targets in an airspace model used in accordance with an embodiment of the invention.

FIG. 15B illustrates information stored for each target in the traffic model 124. Specifically, for each of these targets #1-5, 520A-520E, aircraft heading and speed information is stored in the traffic model 124. For example, target #2 520C is flying at direction of 330° at 90 knots. In contrast, target #5 520A on final approach to runway 06 500 is flying at 60° at 55 knots.

Figure 2:
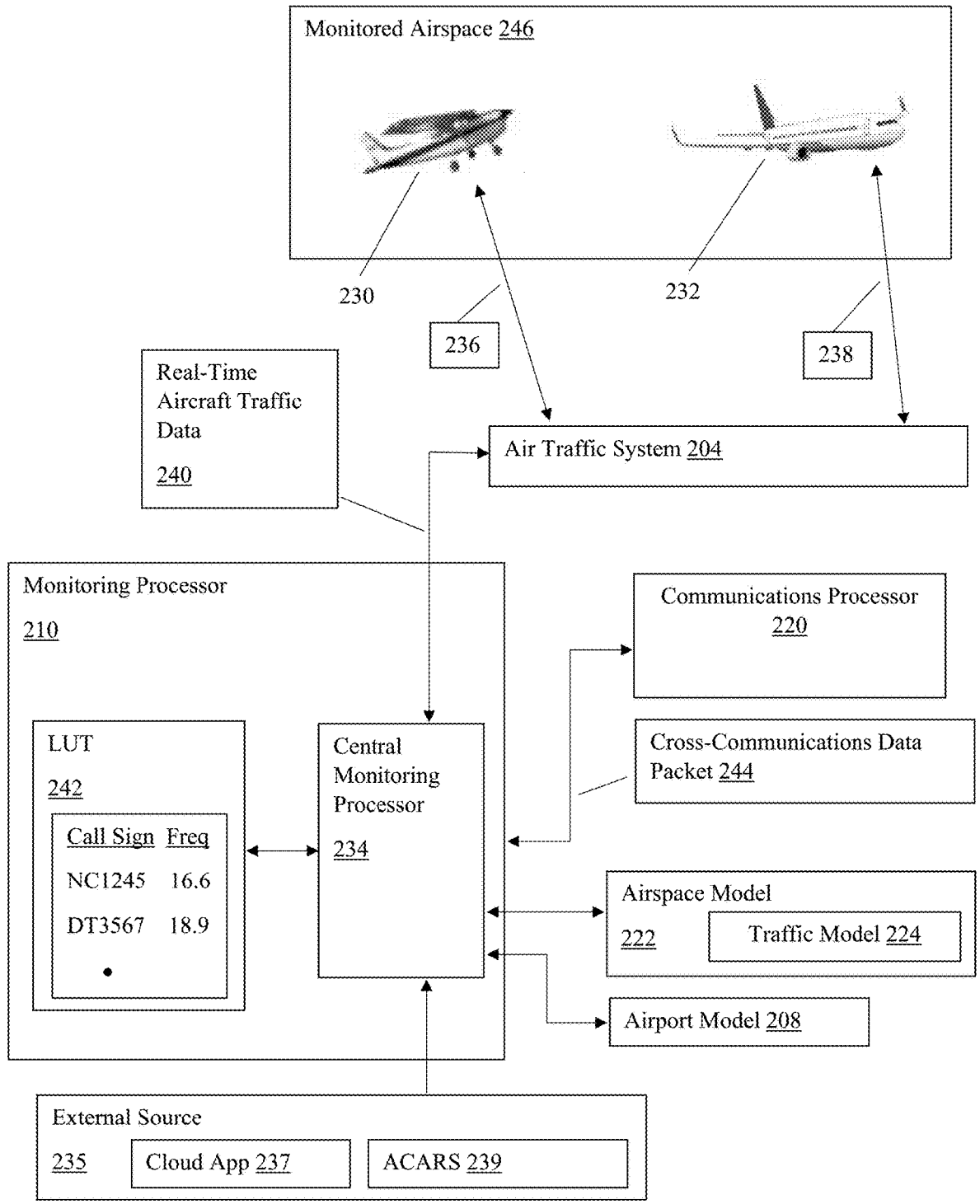
FIG. 2 is a schematic diagram of a monitoring processor generating a cross-communications data packet, in accordance with an embodiment of the invention.

FIG. 2 is a schematic diagram of a monitoring processor 210 generating a cross-communications data packet 244, in accordance with an embodiment of the invention. In FIG. 2, and in other figures herein, it will be appreciated that other components of the automated air-traffic advisory system 100 (see FIG. 1) are omitted for clarity, with like numerals indicating like components in the embodiments. In one embodiment, the monitoring processor 210 (see FIG. 2) is adapted to receive real-time aircraft traffic data 240 for a plurality of aircraft 230, 232 in a monitored airspace 246, for example a non-towered airport. The real-time aircraft traffic data 240 can, for example, be received from the air-traffic system 204 (such as an ADS-B) system, based on real-time aircraft traffic data 236, 238 communicated by the aircraft 230, 232, respectively. Based on the real-time aircraft traffic data 240, in one embodiment, the monitoring processor 210 is adapted to determine the presence of one or more first aircraft 230 that is likely configured for communicating on a first communications frequency 354 (see FIG. 3), such as a frequency for VFR aircraft in the area. Based on the real-time aircraft traffic data 240 (see FIG. 2), the monitoring processor 210 is also adapted to determine the presence of one or more second aircraft 232 that is likely configured for communicating on a second communications frequency 356 (see FIG. 3), such as a different frequency used by IFR aircraft communicating with a remote air traffic control (ATC) location. In one embodiment shown in FIG. 2, a central monitoring processor 234, which can be implemented as a single processor or more than one processor or components of more than one processor, receives the real-time aircraft traffic data 240 and uses it to identify a call sign of the first aircraft 230 and the second aircraft 232. The central monitoring processor 234 then consults a memory containing digitally-stored data implementing a Look-up Table (LUT) 242, to determine a frequency upon which each of the aircraft 230, 232, from which the real-time aircraft traffic data 240 is being received, is likely configured to communicate, for example based on their call signs. For example, in FIG. 2, the LUT 242 stores information indicating that a first aircraft 230 having call sign NC1245 is configured to communicate on a first frequency (here, for example, 16.6) and a second aircraft 232 having call sign DT3567 is configured to communicate on a second frequency (here, for example, 18.9). Alternatively, the central monitoring processor can determine the frequency upon which each of the aircraft 230, 232 is communicating, and, based on an alternative LUT that stores frequencies used locally and remotely, and the airports which use them, determine the frequencies on which each of the aircraft 230, 232 is communicating. Having determined this information, the central monitoring processor 234 determines that one or more of the aircraft 230, 232 are communicating on two or more different frequencies. If so, the central monitoring processor 234 generates a cross-communications data packet 244, so called because there is a need to communicate across the two different frequencies on which the aircraft 230, 232 are communicating, and which the monitoring processor 210 provides to the communications processor 220. The monitoring processor 210 may also communicate with the airspace model 222, including traffic model 224, and the airport model 208, to determine the likely frequency on which the aircraft 230, 232 are configured to communicate, and to determine other information for providing in the cross-communications data packet 244.

In another embodiment shown in FIG. 2, which can be used as an alternative to, or in addition to, the embodiment just described, the monitoring processor 210 does not itself determine the presence and communications frequencies of the aircraft in the monitored airspace. Rather, in this embodiment, the monitoring processor 210, such as the central monitoring processor 234 component, receives data regarding the aircraft in the monitored airspace from an external source 235. For example, receiving data from the external source 235 can involve receiving a message or other communication from a cloud-based application 237, an Aircraft Communications Addressing and Reporting System (ACARS) system, or another external source 235, such as a system sold by FlightAware LLC of Houston, Tex., U.S.A., for example. Thus, in this embodiment, the monitoring processor 210 is adapted to receive a communication of the presence of aircraft operating on different frequencies. Having then received such data from one or more such external sources 235, the system of FIG. 2 can then proceed to send a cross-communications data packet 244, as with other embodiments herein.

Figure 3:
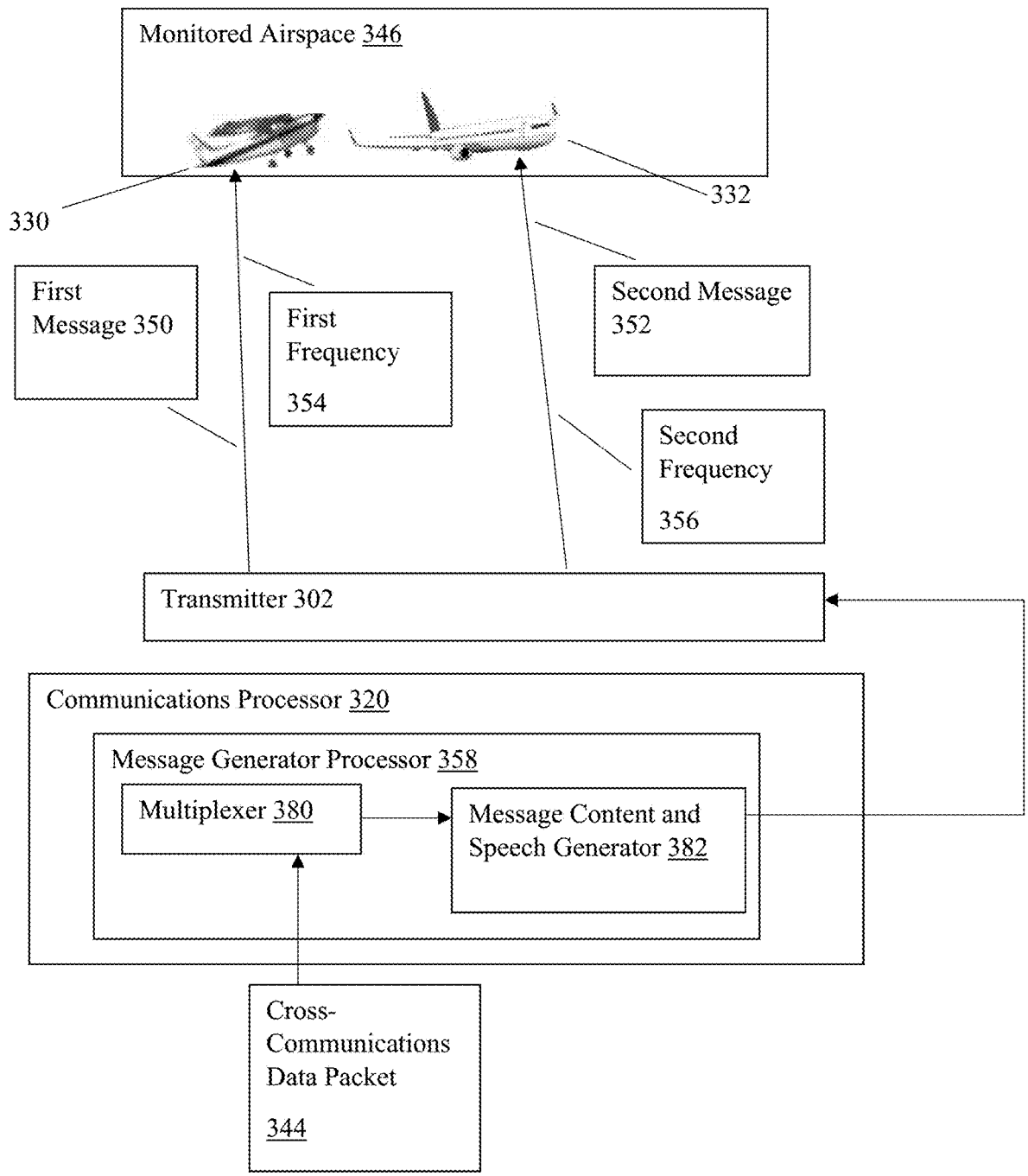
FIG. 3 is a schematic diagram of a communications processor generating first and second messages to aircraft in a monitored airspace, in accordance with an embodiment of the invention.

FIG. 3 is a schematic diagram of a communications processor 320 generating first and second messages 350, 352 to aircraft 330, 332 in a monitored airspace 346, in accordance with an embodiment of the invention. Based on determining the presence of the first aircraft 330 and the second aircraft 332, the monitoring processor 210 (see FIG. 2) provides the cross-communications data packet 344 (see FIG. 3) to the communications processor 320, which is adapted to automatically generate one or more air-traffic advisory messages 350 and 352. For example, in FIG. 3, the communications processor 320 includes a message generator processor 358, which uses a multiplexer 380 to extract and transform relevant data fields of the cross-communications data packet 344 in order to generate two messages 350 and 352. The multiplexer 380 provides these data fields to a message content and speech generator component 382, which generates message content in a format that is ready to be transmitted by a transmitter 302, for each of the messages to be transmitted. The communications processor 320 provides the message content to transmitter 302, which (i) transmits a first message 350 on a first frequency 354 to the first aircraft 330, comprising an alert regarding the second aircraft 332 in the monitored airspace, and (ii) transmits a second message 352 on a second frequency 356 to the second aircraft 332 comprising an alert regarding the first aircraft 330.

Figure 4:
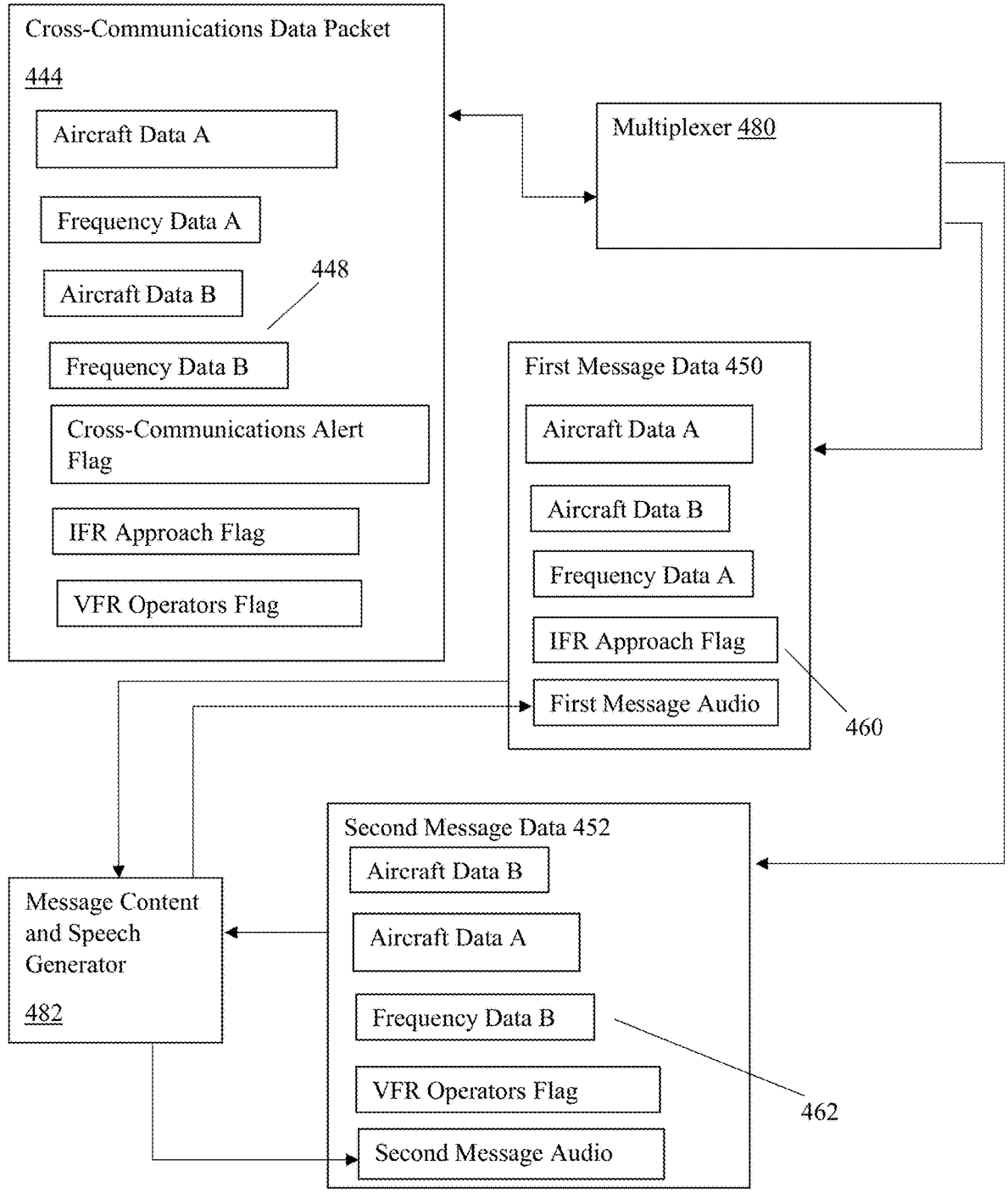
FIG. 4 is a schematic diagram illustrating generation of first message data and second message data by a communications processor, in accordance with an embodiment of the invention.

FIG. 4 is a schematic diagram illustrating generation of first message data 450 and second message data 452 by a communications processor 320 (see FIG. 3), in accordance with an embodiment of the invention. Here, operation of the multiplexer 480 (see FIG. 4) and message content and speech generator 482 are illustrated. The cross-communications data packet 444, provided by the monitoring processor 210 (see FIG. 2) to the communications processor 320 (see FIG. 3) includes several data fields 448 (see FIG. 4). These include, for example: aircraft data A, identifying the first aircraft 330 (see FIG. 3), for example by call sign; frequency data A, indicating the frequency on which the first aircraft is configured to communicate; aircraft data B, identifying the second aircraft, for example by call sign; frequency data B, indicating the frequency on which the second aircraft 332 (see FIG. 3) is configured to communicate; a cross-communications flag, indicating that the two aircraft are communicating on different frequencies; an IFR approach flag, which, as discussed further below, indicates that one of the aircraft is an aircraft operating on Instrument Flight Rules that is on approach into an airport; and a VFR operators flag, which, as discussed further below, indicates that there is a greater number of VFR aircraft than a threshold number of VFR aircraft, operating at the airport. Other data fields may be used.

The cross-communications data packet 444 (see FIG. 4) is provided to the multiplexer 480, which automatically extracts the correct fields of the cross-communications data packet 444 to thereby create first message data 450 and second message data 452. The first message data 450 includes data fields 460, which include, for example the following, which include the data defined above: aircraft data A; aircraft data B; frequency data A; IFR approach flag; and, once it is generated, first message audio (described below). These fields contain the data that will be needed to generate the first message 350 (see FIG. 3) to the first aircraft 330. Likewise, the multiplexer 480 (see FIG. 4) generates the second message data 452, which includes the data fields 462 that will be needed to generate the second message 352 (see FIG. 3) to the second aircraft 332. These data fields 462 (see FIG. 4) include, for example: aircraft data B; aircraft data A; frequency data B; VFR operators flag; and, once it is generated, second message audio (described below).

The multiplexer 480 provides the first message data 450 and second message data 452 to the message content and speech generator 482, which uses the necessary fields from data fields 460 and 462, other than the audio fields, to generate the first message audio field and the second message audio field. For example, the message content and speech generator 482 can automatically generate audio content that is readily understandable by a pilot to alert the pilot to the information contained in the first message data 450 and second message data 452, regarding another aircraft. For example, based on the first message data 450, the message content and speech generator 482 can put together first message audio indicating "Aircraft A, be aware that incoming IFR aircraft is on approach to runway 06." Similarly, based on the second message data 452, the message content speech generator 482 can put together second message audio indicating "Aircraft B, be aware that a large amount of local traffic is operating on VFR in the area of the airport that you are approaching on runway 06."

Figure 5:
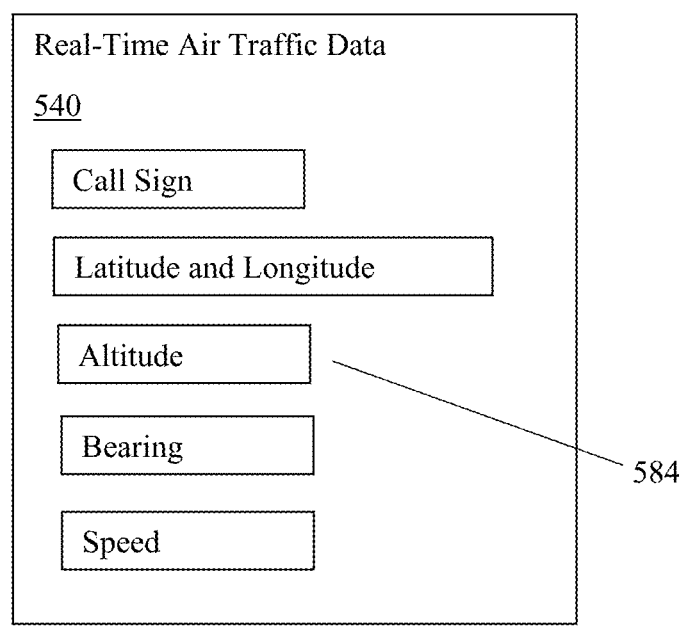
FIG. 5 is a schematic diagram of real-time air traffic data, used in accordance with an embodiment of the invention.

FIG. 5 is a schematic diagram of real-time air traffic data 540, used in accordance with an embodiment of the invention. This information can, for example, include data fields 584 for an aircraft such as its call sign, latitude and longitude, altitude, bearing and speed. It will be appreciated that other formats of real-time air traffic data 540 can be used. This data may be provided by the air traffic system 204 (see FIG. 2) for aircraft 230, 232 in the monitored airspace 246 and, in some situations, for aircraft outside the monitored airspace. The real-time aircraft traffic data 540 (see FIG. 5) may comprise data broadcast from the aircraft 230, 232 (see FIG. 2) in the monitored airspace 246 and can, for example, comprise Automatic Dependent Surveillance-Broadcast (ADS-B) data.

Figure 6:
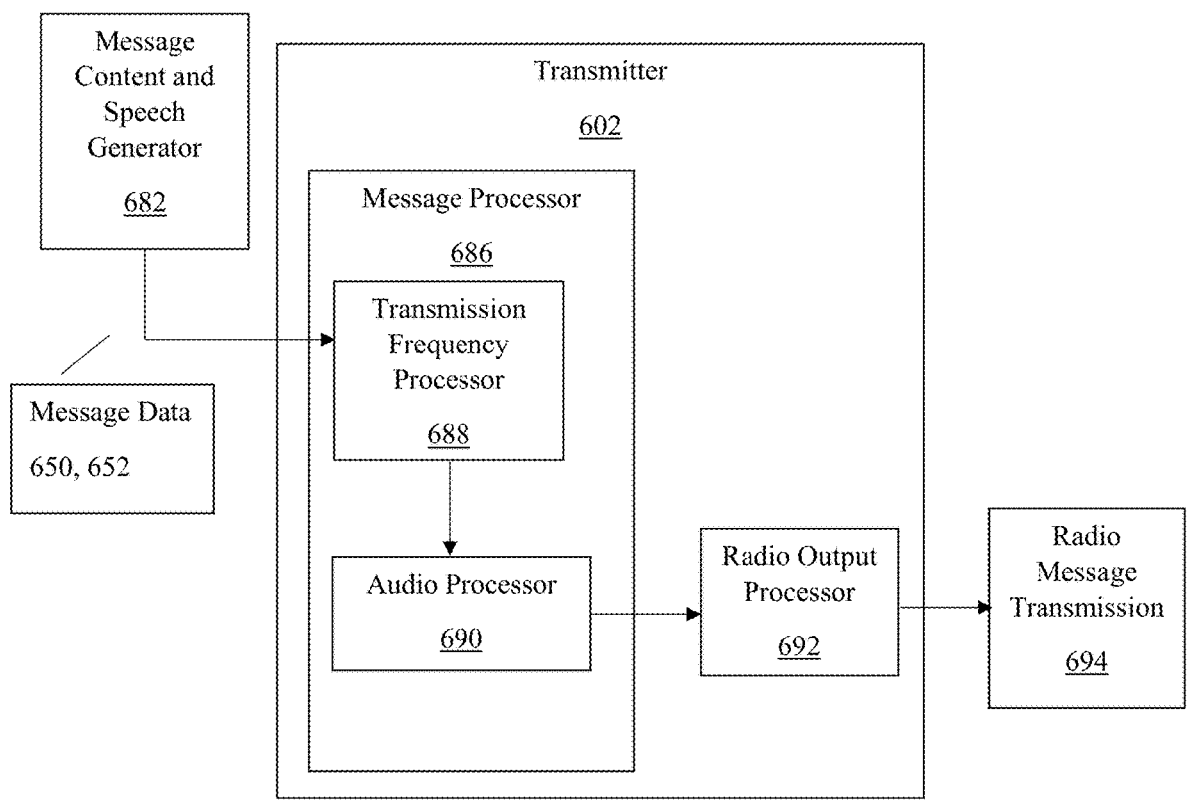
FIG. 6 is a schematic diagram illustrating operation of a transmitter in generating a radio message transmission based on message data, in accordance with an embodiment of the invention.

FIG. 6 is a schematic diagram illustrating operation of a transmitter 602 in generating a radio message transmission 694 based on message data 650, 652, in accordance with an embodiment of the invention. Here, the transmitter 602 is in communication with the communications processor 320 (see FIG. 3) and is adapted to (i) on the first communications frequency 354, automatically communicate the first message 350 to the first aircraft 330; and (ii) on the second communications frequency 356, automatically communicate the second message 352 to the second aircraft. As shown in FIG. 6, the transmitter 602 can do this by receiving message data 650, 652 for each of the first message 450 (see FIG. 4) and the second message 452 (see FIG. 4). Using whichever data 650 or 652 (see FIG. 6) that it has received from the message content and speech generator 682, the transmitter 602 transforms the message data 650, 652 into a radio message transmission 694. The transmitter 602 includes a message processor 686, which includes a transmission frequency processor 688 to extract a frequency field from the message data 650, 652, and an audio processor 690 to extract a message audio field from the message data 650, 652. Using these, the radio output processor 692 generates a radio message transmission 694 which is output from the transmitter 602 on the correct frequency from the frequency field of the message data 650, 652, containing the audio content from the message audio field.

Figure 8:
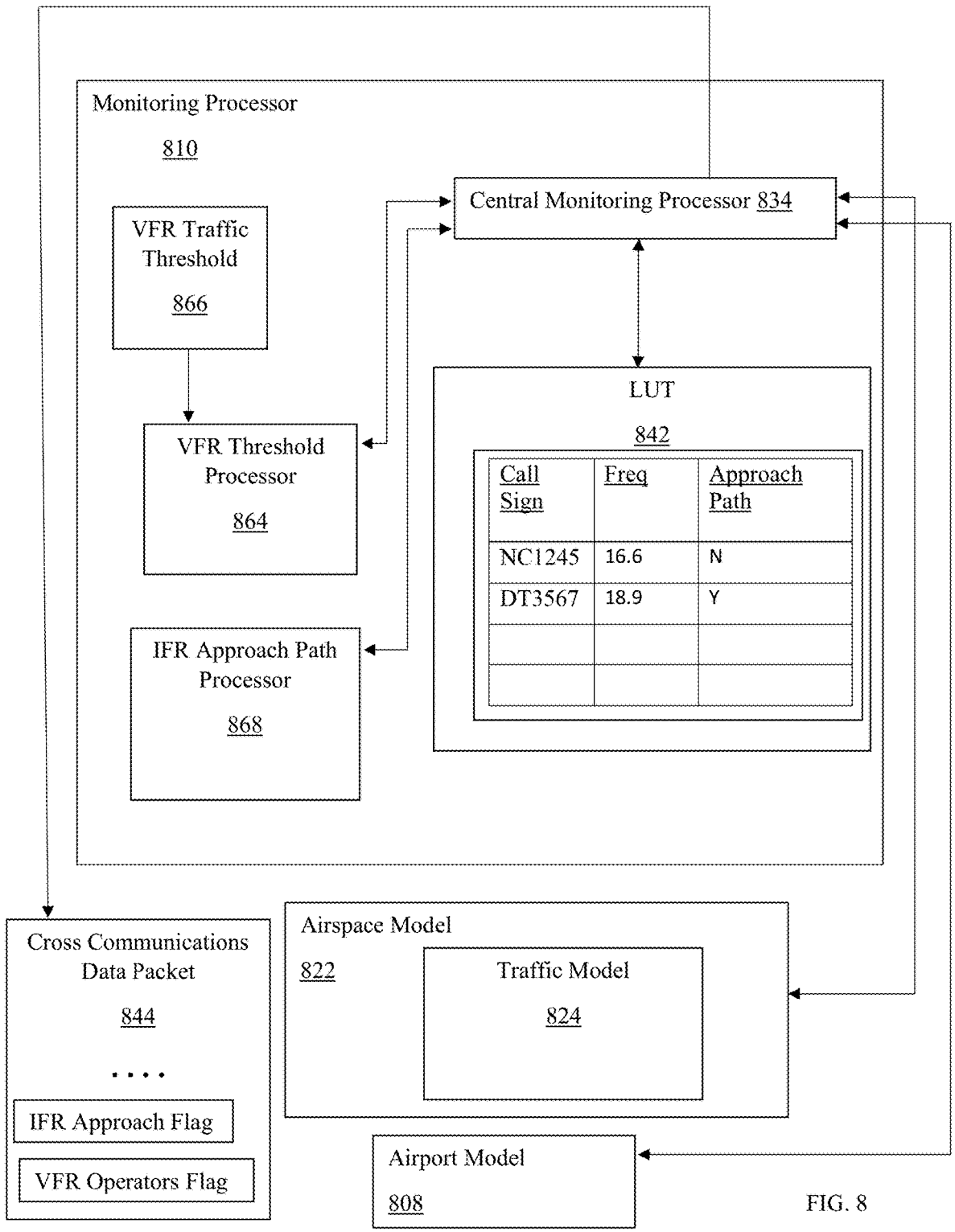
FIG. 8 is a schematic diagram illustrating operation of a monitoring processor in determining the presence of a number of aircraft operating on Visual Flight Rules (VFR) and the presence of an aircraft on an Instrument Flight Rules (IFR) approach path, in accordance with an embodiment of the invention.

FIG. 8 is a schematic diagram illustrating operation of a monitoring processor 810 in determining the presence of a number of aircraft operating on Visual Flight Rules (VFR) and the presence of an aircraft on an Instrument Flight Rules (IFR) approach path, in accordance with an embodiment of the invention. Here, the central monitoring processor 834 uses a VFR threshold processor 864 to determine whether there is a greater number of VFR aircraft present in the monitored airspace than a threshold number, which is stored, for example in a memory, in VFR Traffic Threshold component 866. Likewise, the central monitoring processor 834 uses an IFR Approach Path Processor 868 to determine the presence of an aircraft operating on IFR and on an approach path in the monitored airspace. The central monitoring processor 834 makes these determinations, for example, by consulting a LUT 842, the airspace model 822, traffic model 824 and the airport model 808. The central monitoring processor 834 determines from the airspace model that a VFR operator is in the monitored airspace, for example using LUT 842 in a similar fashion to that described in FIG. 2, above. For each such VFR operator, the VFR threshold processor 864 increments a counter and compares it with VFR Traffic Threshold 866 to determine whether the number of VFR operators is greater than a number stored in VFR Traffic Threshold 866. If so, VFR Threshold Processor 864 sends a communication to central monitoring processor 834, which accordingly sets a flag, indicated as VFR Operators Flag, in the cross-communications data packet 844. When this flag is set in the cross-communications data packet 844, the communications processor 320 (see FIG. 3) is able to generate appropriate content using message content and speech generator 482 (see FIG. 4) to alert other traffic that a large number of VFR operators are operating in the monitored airspace. For example, the communications processor 320 (see FIG. 3) can send, to a first aircraft 330, which is operating on VFR in the monitored airspace 346, an air-traffic advisory message comprising an alert regarding a second aircraft 332 in the monitored airspace 346 being an approaching Instrument Flight Rules (IFR) aircraft. Likewise, an IFR approach path processor 868 (see FIG. 8) receives data from the central monitoring processor 834, based on LUT 842, airspace model 822, traffic model 824 and airport model 808 to determine whether an IFR operator is on an approach path in the monitored airspace. This can, for example, be indicated in an Approach Path field in LUT 842 corresponding to each aircraft call sign. If there is such an IFR operator, the IFR approach path processor 868 provides a communication to central monitoring processor 834, which sets an IFR Approach Flag in cross-communications data packet 844. When this flag is set in the cross-communications data packet 844, the communications processor 320 (see FIG. 3) is able to generate appropriate content using message content and speech generator 482 (see FIG. 4) to alert other traffic that an IFR operator is on an approach path in the monitored airspace. For example, the communications processor 320 (see FIG. 3) can send, to the second aircraft 332 operating on IFR in the monitored airspace 346, an alert regarding the first aircraft 330 being an aircraft operating on Visual Flight Rules (VFR) in the monitored airspace 346.

Figure 7:
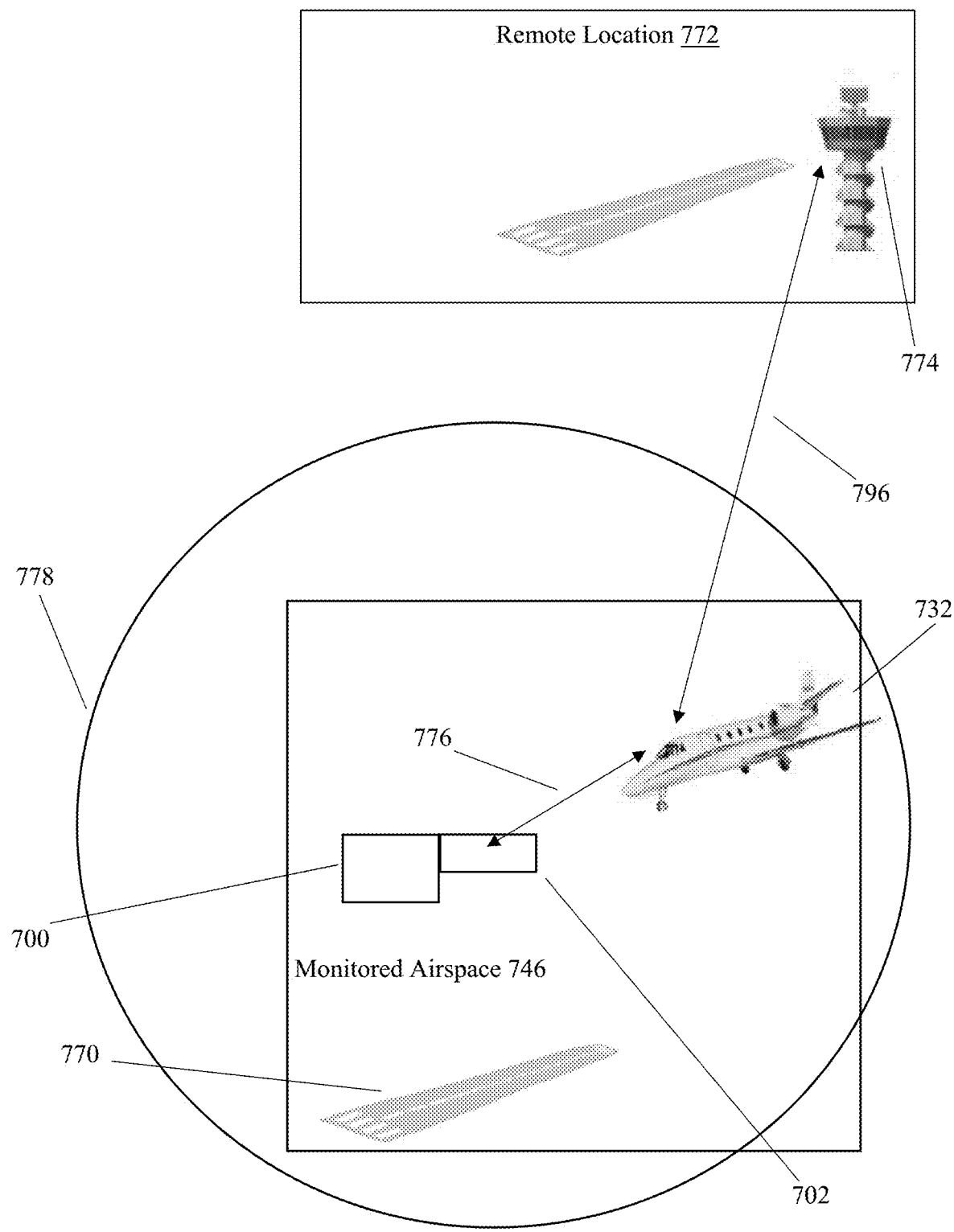
FIG. 7 is a schematic diagram illustrating operation of an automated air-traffic advisory system transmitting at a power that is sufficient to reach an aircraft within a monitored airspace, but not to reach a remote location, in accordance with an embodiment of the invention.

FIG. 7 is a schematic diagram illustrating operation of an automated air-traffic advisory system 700 transmitting at a power 778 that is sufficient to reach an aircraft 732 within a monitored airspace 746, but not to reach a remote location 772, in accordance with an embodiment of the invention. In this mode of operation, which can be referred to as a "whisper" mode, the automated air-traffic advisory system 700 is able to communicate on frequencies that may be, otherwise, exclusively assigned for use of the remote location 772, such as by air traffic control 774 at a remote, towered airport, when the automated air-traffic advisory system 700 is at a non-towered airport 770. This permits the automated air-traffic advisory system 700 to communicate with an aircraft 732 that is in communication 796 with the air-traffic control 774 at the remote location, without disturbing the remote air-traffic control 774 itself, by virtue of communicating at the lower power level 778. The aircraft 732 with which the system 700 communicates may be an aircraft operating on Instrument Flight Rules (IFR) in the monitored airspace 746, in communication with Air Traffic Control (ATC) 774 at the remote location 772, outside the monitored airspace 746. The system's transmitter 702 is adapted to communicate on an air traffic frequency 776 that is assigned for use of aircraft communications at the remote location 772, which is out of effective radio range of the monitored airspace 746, using a transmission power 778 for the automatically communicating that is sufficiently low in power to avoid receipt of the at least one air-traffic advisory message at the remote location 772 but sufficiently high in power to permit receipt of the at least one air-traffic advisory message in the monitored airspace 746. The transmitter 702 can be adapted to so communicate by, for example, being automatically set to send a transmission at the appropriate frequency for the remote location 772 upon activation of the "whisper mode" of communication. The air traffic frequency 776 that is assigned for the use of aircraft communications at the remote location 772 can comprise a Common Traffic Advisory Frequency (CTAF).

Figure 9:
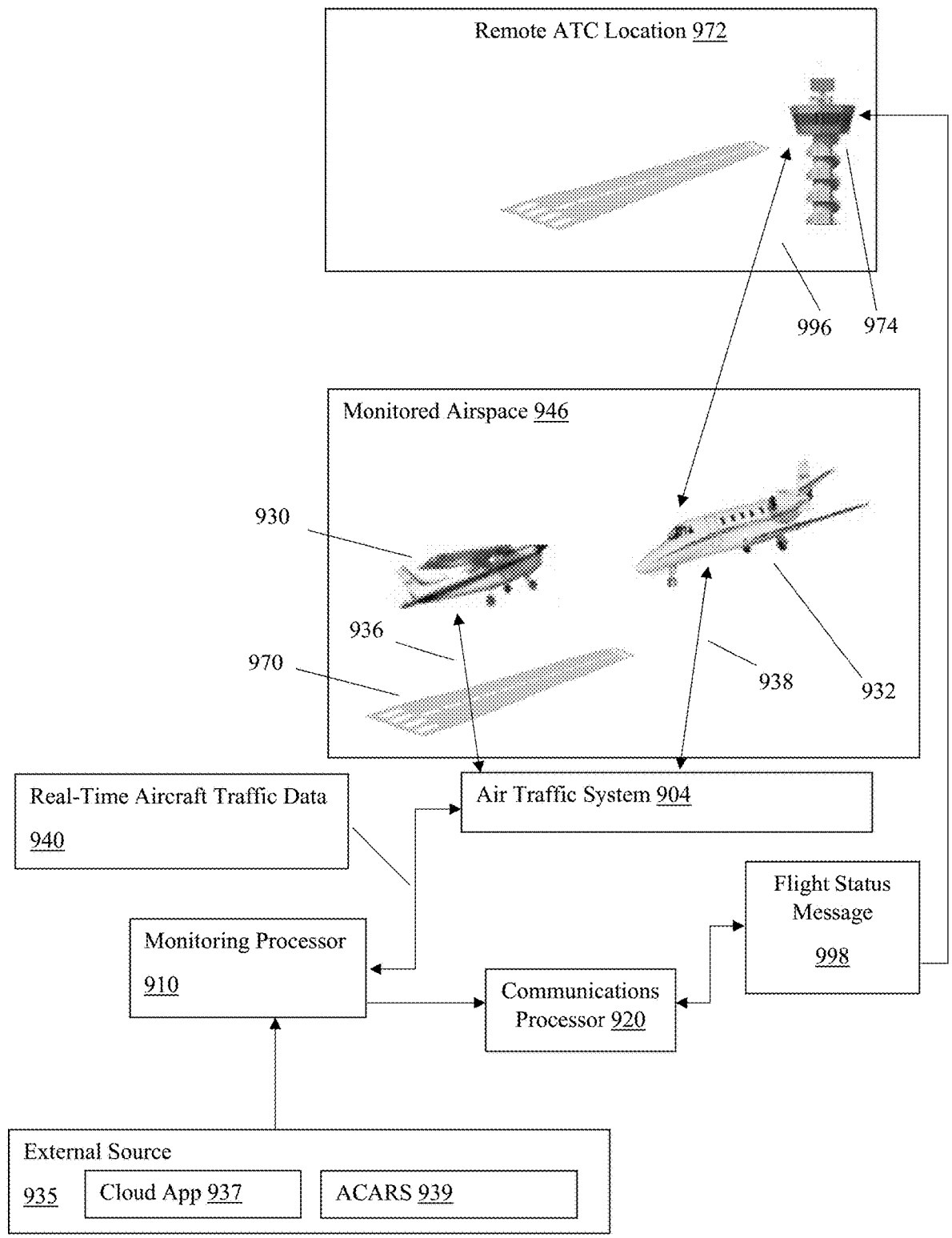
FIG. 9 is a schematic diagram of an automated air-traffic advisory system generating a flight status message for use of a remote air traffic control (ATC) location, in accordance with an embodiment of the invention.

FIG. 9 is a schematic diagram of an automated air-traffic advisory system generating a flight status message 998 for use of a remote air traffic control (ATC) location 972, in accordance with an embodiment of the invention. In this embodiment, the automated air-traffic advisory system is used to keep the remote ATC location 972 informed of the flight status of local aircraft traffic, for example to "clear" the monitored airspace 946 for use of other aircraft that are under the control of the remote ATC location 972. In one embodiment, the system comprises a monitoring processor 910 adapted to receive real-time aircraft traffic data 940 for a plurality of aircraft 930, 932 in a monitored airspace 946, such as a non-towered airport 970, located remotely from the Air Traffic Control (ATC) location 972. In an embodiment, the monitoring processor 910 is adapted to, based on at least the real-time aircraft traffic data 940, determine a flight status of an aircraft 932 operating under Instrument Flight Rules (IFR) in the monitored airspace 946 and being assigned to be controlled by the remotely located Air Traffic Control (ATC) location 972. In another embodiment, the monitoring processor 910 is configured to receive data regarding the flight status of aircraft in the monitored airspace from an external source 935, as an alternative to, or in addition, determining such a flight status of such aircraft itself. For example, the monitoring processor 910 can receive data regarding the flight status of the aircraft as one or more of: a message from a cloud-based application 937, an Aircraft Communications Addressing and Reporting System (ACARS) system 939, a system sold by FlightAware LLC of Houston, Tex., U.S.A., or as a communication from another external source 935. Thus, in this embodiment, the monitoring processor 910 is adapted to receive a communication of the flight status of the at least one aircraft operating under Instrument Flight Rules (IFR) in the monitored airspace and being assigned to be controlled by the remotely located Air Traffic Control (ATC) location. A communications processor 920 is adapted to, based on the flight status of the aircraft 932 operating under Instrument Flight Rules (IFR), automatically generate a message 998 for use of the remote Air Traffic Control (ATC) 974 indicating the flight status of the aircraft 932 operating under Instrument Flight Rules (IFR). In one embodiment the monitoring processor 910 receives the real-time aircraft traffic data 940 from air traffic system 904, which receives traffic data 936, 938 transmitted from the aircraft 930, 932; or the monitoring processor 910 can receive information regarding a flight status from an external source 935; or both. The aircraft 932, which was previously in communication 996 with remote ATC 974, may have lost ability to communicate with the remote ATC location 972, for example by going below an altitude or beyond a range at which communication with remote ATC location 972 is possible. Therefore, by transmitting flight status 998, the system is able to keep remote ATC 974 informed regarding the status of aircraft 932 using the monitored airspace 946, but under control of the remote ATC location 972.

Figure 10:
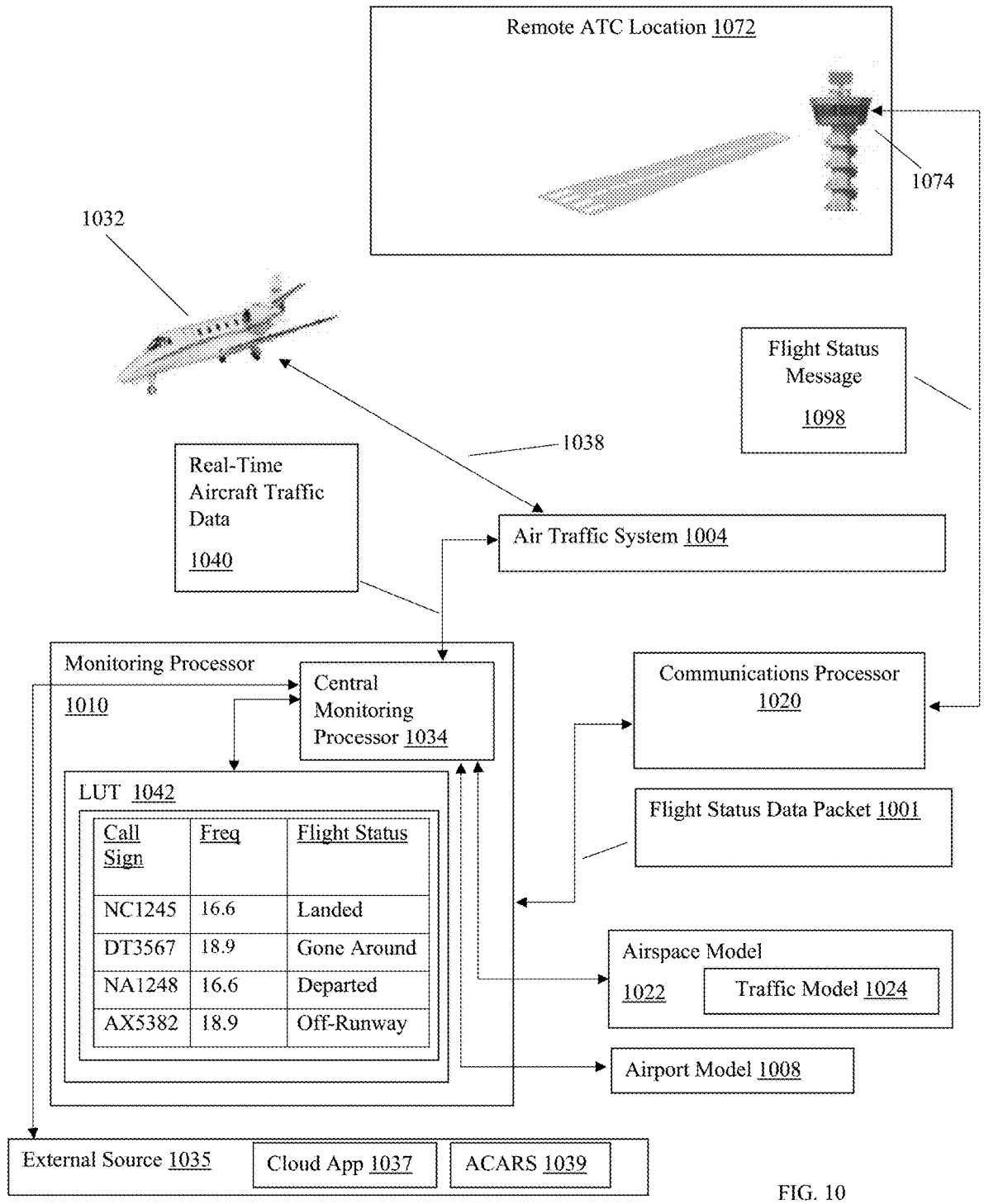
FIG. 10 is a schematic diagram illustrating operation of a monitoring processor in determining or receiving a flight status of an aircraft under control of a remote ATC location, in accordance with an embodiment of the invention.

FIG. 10 is a schematic diagram illustrating operation of the monitoring processor 1010 in determining or receiving a flight status of an aircraft 1032 under control of a remote ATC location 1072, in accordance with an embodiment of the invention. In one embodiment, the central monitoring processor 1034 consults LUT 1042, airspace model 1022, traffic model 1024 and airport model 1008 to determine the flight status of the aircraft 1032. For example, the flight status may comprise at least one of: a landed status, a gone around status, a departed status, and an off-runway status (for example in an emergency in which the aircraft 1032 has gone off the runway). These can for example be indicated in a LUT 1042, or determined directly from the airspace model 1022 and airport model 1008. The information used by the airspace model 1022 and LUT 1042 can be provided in real time by the air traffic system 1004, which obtains real time aircraft transponder data 1038 transmitted from aircraft 1032, and sends formatted real-time aircraft traffic data 1040 to the central monitoring processor 1034. In another embodiment, the monitoring processor 1010 is configured to receive data regarding the flight status of aircraft in the monitored airspace from an external source 1035, as an alternative to, or in addition, determining such a flight status of such aircraft itself. For example, the monitoring processor 1010 can receive data regarding the flight status of the aircraft as one or more of: a message from a cloud-based application 1037, an Aircraft Communications Addressing and Reporting System (ACARS) system 1039, a system sold by FlightAware LLC of Houston, Tex., U.S.A., or as a communication from another external source 1035. Based on determining or receiving the flight status, or both, the monitoring processor 1010 creates a flight status data packet 1001, for example containing data fields shown in 1101 (see FIG. 11) of the aircraft 1032 (see FIG. 10), and communicates the flight status data packet 1001 to the communications processor 1020. The communications processor 1020, in turn, generates a flight status message 1098 for use of ATC 1074 at the remote ATC location 1072.

Figure 11:
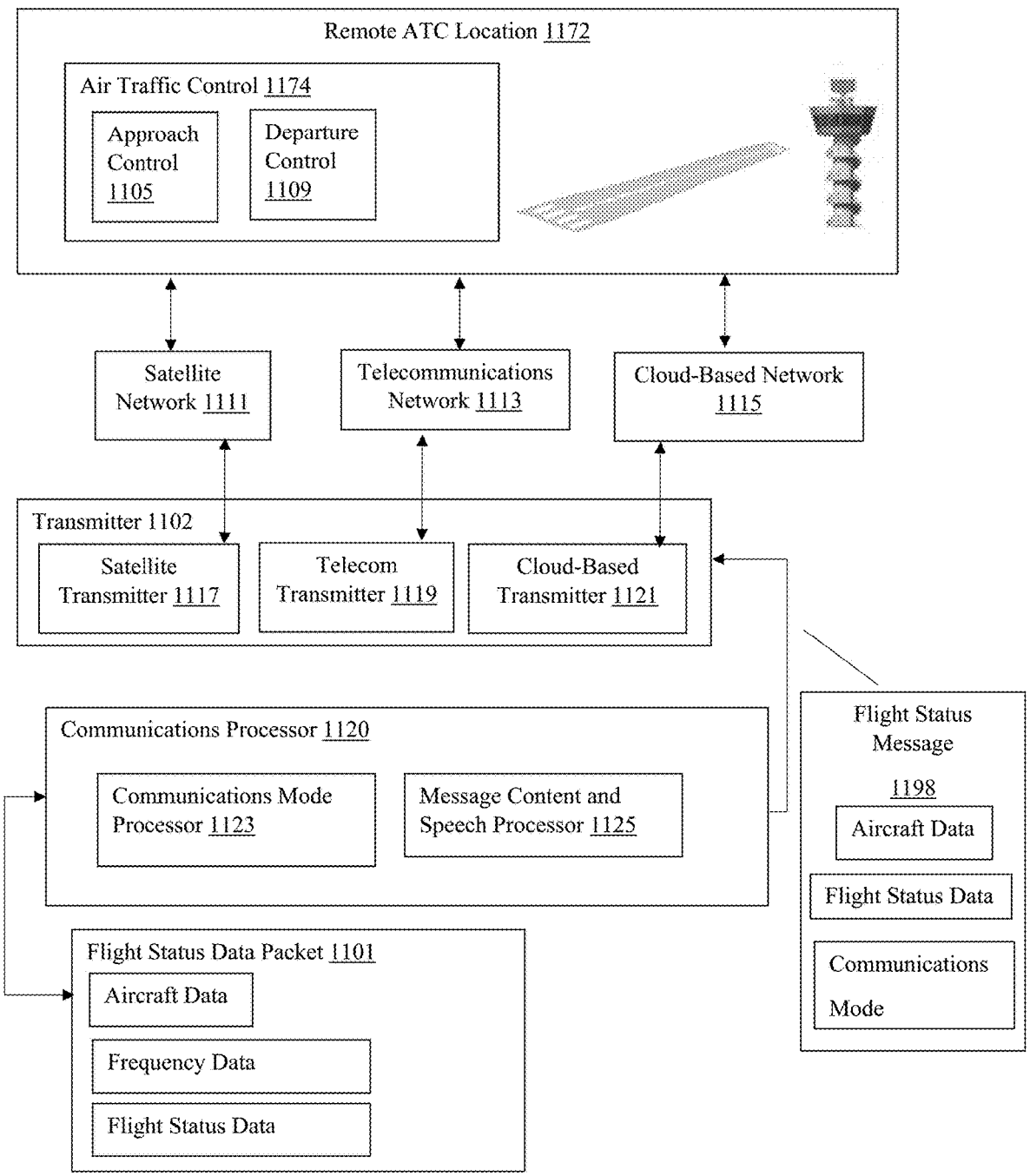
FIG. 11 is a schematic diagram illustrating operation of a communications processor in generating a flight status message for use of a remote ATC location, in accordance with an embodiment of the invention.

FIG. 11 is a schematic diagram illustrating operation of the communications processor 1120 in generating the flight status message 1198 for use of the remote ATC location 1172, in accordance with an embodiment of the invention. Here, the communications processor 1120 receives the flight status data packet 1101 from the monitoring processor 1010 (see FIG. 10), which includes aircraft data (such as a call sign), frequency data (such as a CTAF frequency on which the aircraft is communicating) and the flight status data.

Using this data in the flight status data packet 1101, a communications module processor 1123 and message content and speech processor 1125 of the communications processor 1120 generates a flight status message 1198. For example, the communications mode processor 1123 can determine what communications mode is preferred by the remote ATC location 1172 corresponding to the frequency data (such as the CTAF frequency). The remote ATC location 1172 may, for example, prefer to receive communications by satellite network 1111, telecommunications network 1113 or cloud-based network 1115, and this preference can be determined by the communications mode processor 1123. Based on this, the message content and speech processor 1125 generates the flight status message 1198, which includes aircraft data, flight status data, and communications mode data, to be communicated to the transmitter 1102 for the actual transmission to the remote ATC location 1172. The transmitter 1102 is configured to communicate the message for use of the remote Air Traffic Control (ATC) 1172, for example by including one or more of a satellite transmitter 1117, telecommunications transmitter 1119 or cloud-based transmitter 1121. By including such components, the transmitter 1102 can be adapted to transmit a satellite message, an automatic telecommunications message or a message for use of a cloud-based application. The transmitter may be further adapted to transmit the message for use of at least one of Air Traffic approach control 1105 and Air Traffic departure control 1109 at the Air Traffic Control (ATC) location 1172, for example by storing information regarding network addresses or identifiers for each communications mode that are used by approach control 1105 and departure control 1109. In this way, Air Traffic Control 1174 at the remote ATC location 1172 can receive automatic transmissions (such as text messages, satellite messages or e-mails) indicating the flight status of aircraft at remote locations, such as non-towered airports, where the aircraft are under control of the remote ATC location 1172, but potentially out of communications range.

Figure 12:
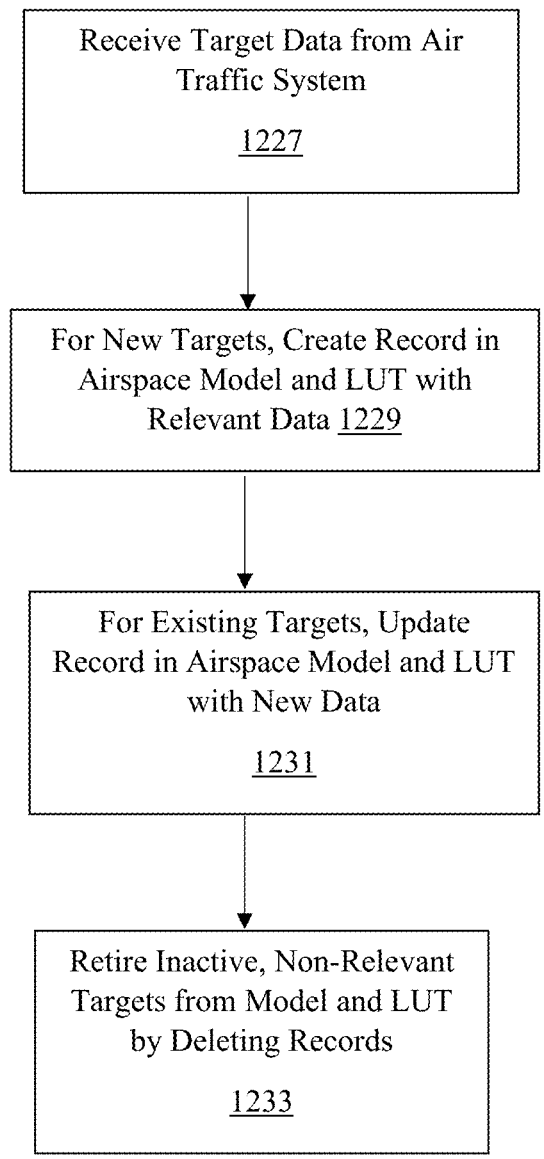
FIG. 12 is a schematic block diagram of a method of updating an airspace model and lookup-table, in accordance with an embodiment of the invention.

FIG. 12 is a schematic block diagram of a method of updating an airspace model 222 and lookup-table (LUT) 242 (see FIG. 2), in accordance with an embodiment of the invention. The monitoring processor 210 constantly receives 1227 aircraft information updates from the air traffic system 204. And based on the retrieved information, a record is created 1229 for each new aircraft target in the monitored airspace, and any necessary entry is created in the LUT. The record in the airspace model includes aircraft location information, aircraft registration, aircraft type, and any other relevant air traffic control information with respect to the target aircraft, and LUT entries can include any such relevant information as well, including LUT data fields illustrated herein. For existing targets, known to be within the monitored airspace, the record, and if need be the LUT, is updated 1231 to aid in determining their probable trajectory. If an aircraft discontinues responding to interrogation signals, it is presumed that the target aircraft has flown out of the monitored airspace. In this case, the tracking information record, and any corresponding entries in the LUT, is deleted 1233 so that the memory resources are available for new aircraft.

One example of use of an embodiment according to the invention is as follows. An IFR aircraft on a low-weather approach into an airport is talking to remote air traffic control on frequency "A." The inbound IFR aircraft does not listen to, or hear, local airport traffic that is communicating on frequency "B." The airport local area traffic on frequency "B" does not hear the inbound aircraft. Suddenly, the inbound aircraft is surprised to be "dumped" into local airport traffic, and the local airport traffic is surprised by the sudden and unannounced arrival of the aircraft on final. Here, it is worth noting that the highest number of mid-air collisions is in the vicinity of airports. In an embodiment, the monitoring processor sees both the inbound aircraft and local airport traffic, and automatically creates advisories to bridge the communications gap. The system transmits to local airport traffic on frequency "B," for example as follows: "Potomac traffic, be advised, an aircraft is on three mile final for runway 6." Also, the system "whispers" to inbound aircraft on frequency "A," for example, as the aircraft gets to 2 miles from the airport, such as using a message like the following: "N12345, be advised, numerous traffic at Potomac (using runway 24)."

In another example of use of an embodiment, the system can automatically notify remote air traffic control of the status of an aircraft that is remote from air traffic control, or en route to a remote location. Air traffic control often has gaps in radar and radio coverage, especially at outlying airports or remote areas. When air traffic cannot observe or communicate with an aircraft in those areas, they must keep those areas closed to other IFR traffic, until the prior aircraft status is known. Thus, in an embodiment, the monitoring processor observes aircraft movements and remotely reports aircraft status to air traffic control, for example by text, e-mail, automated call or other means. As an example, suppose that an aircraft has descended below radar coverage and radio contact going into Potomac airport. The monitoring processor observes the aircraft landing, and sends a message to air traffic approach control, such as "N86121 has landed at Potomac airfield at 12:14Z" or "N86121 on gone around at Potomac, standby for contact by aircraft." In another example, suppose that air traffic control is keeping airspace closed while waiting for a departing IFR aircraft to get above 6,000 feet to be observed on radar, before allowing another aircraft into that airspace. The monitoring processor observes the aircraft departing, and the system call air traffic departure control, giving an automatic message such as "N86121 has taken off Potomac airfield at 14:23Z."

In a further example of use of an embodiment according to the invention, when an aircraft is arriving to a given airport, the pilots (or automated equipment on the aircraft) initiate an Aircraft Communications Addressing and Reporting System (ACARS) update to an airline dispatcher (known as "dispatch"). The airline's dispatch, and/or the ACARS system itself, can then send that notification to a system in accordance with an embodiment of the present invention. Since the system is then aware of the aircraft traffic at a given location from such a notification, or for example from any other remote sensing or external source (such as a message from a cloud-based application), the system can then instruct its own equipment (such as communications processor 220) to adjust its communications accordingly. For example, communications processor 220 can send a cross-communications data packet 244 to alert other aircraft of the arriving aircraft operating on a different frequency than local traffic. As an example, the ACARS system could send out a series of cloud-application notification of a UPS jet about to arrive into Redlands airport, based on which the following alerts to local traffic can be generated: "Redlands traffic advisory, heavy jet inbound in 5 minutes," followed by "Redlands traffic advisory, heavy jet arriving in 2 minutes," followed by "Redlands traffic advisory, heavy jet arriving."

In another example of operation of an embodiment according to the invention, a system can provide an ACARS-like service to remote locations and for smaller aircraft that do not have such equipment or coverage, by communicating with air traffic control regarding flight status of such smaller aircraft at remote locations. For example, if an aircraft landing at Eastern Papua has ADS-B that can be detected an embodiment system, or that can be detected by any other means and communicated to the system, then the system can send an ACARS-like text message to Jakarta air traffic control, and/or send an automated phone call to the air traffic controller (for example). The system can, for example, communicate a message to air traffic control such as "Cessna N86121 has just landed—Eastern Papua 12:45Z." In one embodiment, such communications to air traffic control can be formatted in the manner of, or feed into, an ACARS system.

Systems, methods, computer-readable media, components and embodiments taught herein may make use of features taught in U.S. Pat. No. 6,380,869 B1 of Simon et al., and in U.S. Pat. No. 6,552,669 B2 of Simon et al., the teachings of both of which patents are incorporated by reference in their entirety.

In an embodiment according to the invention, the components of the automated air-traffic advisory system and associated transmitter can be implemented in a compact unit that can be portable and mobile, including for example a portable computer processor, satellite transmitter, radio transmitter, cloud-based transmitter or telecommunications transmitter. Such units can be conveniently used to extend the capabilities of remote non-towered airports.

In an embodiment according to the invention, processes described as being implemented by one processor may be implemented by component processors, and/or a cluster of processors, configured to perform the described processes, which may be performed in parallel synchronously or asynchronously. Such component processors may be implemented on a single machine, on multiple different machines, in a distributed fashion in a network, or as program module components implemented on any of the foregoing.

Figure 16:
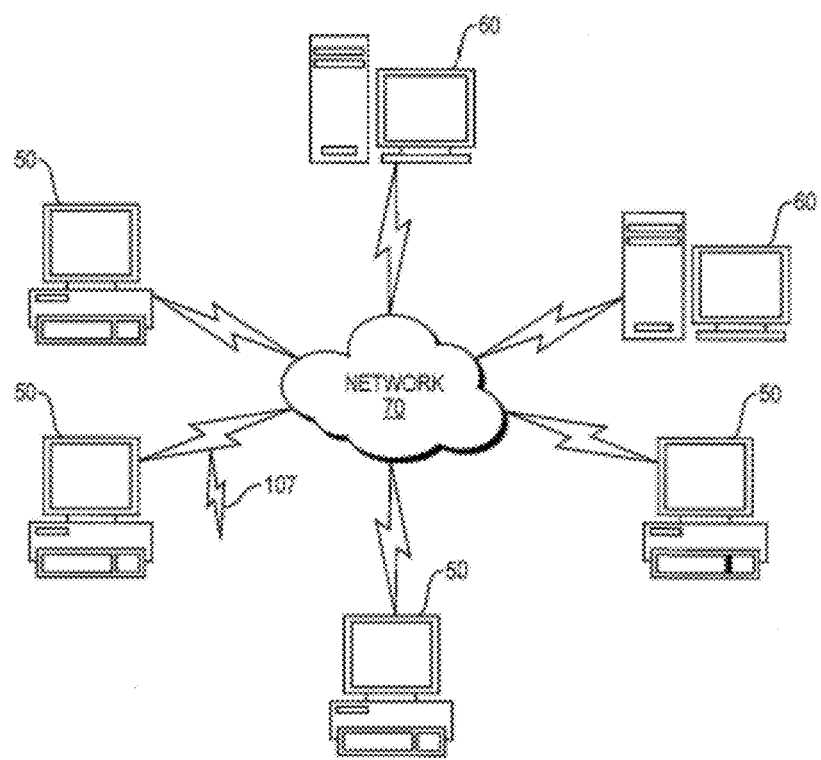
FIG. 16 illustrates a computer network or similar digital processing environment in which embodiments of the present invention may be implemented.

FIG. 16 illustrates a computer network or similar digital processing environment in which embodiments of the present invention may be implemented. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 17:
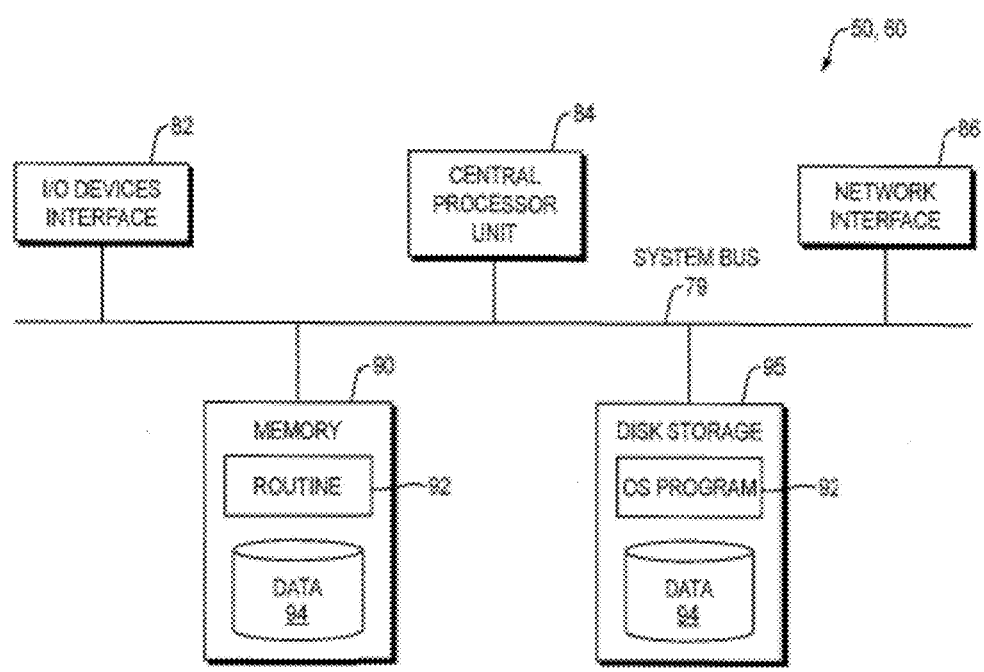
FIG. 17 is a diagram of an example internal structure of a computer (e.g., client processor/device or server computers) in the computer system of FIG. 16.

FIG. 17 is a diagram of an example internal structure of a computer (e.g., client processor/device 50 or server computers 60) in the computer system of FIG. 16. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (including, for example, to implement one or more of: an automated air-traffic advisory system 100, a monitoring processor 110, a communications processor 120, an airspace model 122, a traffic model 124, an airport model 108, a Look-up Table (LUT) 210, a central monitoring processor 234, a message generator processor 358, a multiplexer 380, a speech generator 382, a message content and speech generator 382, at least a portion of a transmitter 602, a message processor 686, a transmission frequency processor 688, an audio processor 690, a radio output processor 692, a VFR threshold processor 864, an IFR approach path processor 868, a communications mode processor 1123, a message content and speech processor 1125, and other components detailed herein). Disk storage 95 provides non-volatile storage for computer software instructions 92 and data 94 used to implement an embodiment of the present invention. A central processor unit 84 is also attached to the system bus 79 and provides for the execution of computer instructions, for example having a flow of data and control like any of the embodiments taught herein.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection 107. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

In other embodiments, the software instructions 92 and data 94 are provided on a cloud platform, as SaaS (Software as a Service), and the like.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of automatically communicating air-traffic advisory messages, the method comprising:

automatically communicating at least one air-traffic advisory message, the automatically communicating being based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, and the at least one first aircraft and the at least one second aircraft operating on different communications frequencies, the automatically communicating the at least one air-traffic advisory message comprising one or more of:
  (i) on the first communications frequency, automatically communicating to the at least one first aircraft a message comprising an alert regarding the at least one second aircraft in the monitored airspace; and
  (ii) on the second communications frequency, automatically communicating to the at least one second aircraft a message comprising an alert regarding the at least one first aircraft in the monitored airspace.

2. The method of claim 1, further comprising:
  receiving, with at least one monitoring processor, real-time aircraft traffic data for the plurality of aircraft in the monitored airspace;
  based on at least the real-time aircraft traffic data, determining with the at least one monitoring processor the presence of the at least one first aircraft of the plurality of aircraft configured for communicating on the first communications frequency; and
  based on at least the real-time aircraft traffic data, determining with the at least one monitoring processor the presence of the at least one second aircraft of the plurality of aircraft configured for communicating on the second communications frequency.

3. The method of claim 1, further comprising:
  receiving a communication of the presence of the at least one first aircraft and of the presence of the at least one second aircraft.

4. The method of claim 3, wherein receiving the communication of the presence of the at least one first aircraft and of the presence of the at least one second aircraft comprises one or more of: (i) receiving a message from a cloud-based application; and (ii) receiving a message from an Aircraft Communications Addressing and Reporting System (ACARS).

5. The method of claim 1, wherein the at least one first aircraft comprises an aircraft operating on Visual Flight Rules (VFR) in the monitored airspace.

6. The method of claim 1, wherein the at least one second aircraft comprises an aircraft operating on Instrument Flight Rules (IFR) in the monitored airspace.

7. The method of claim 1, wherein the automatically communicating the at least one air-traffic advisory message comprises both:
  (i) on the first communications frequency, automatically communicating to the at least one first aircraft a message comprising an alert regarding the at least one second aircraft in the monitored airspace; and
  (ii) on the second communications frequency, automatically communicating to the at least one second aircraft a message comprising an alert regarding the at least one first aircraft in the monitored airspace.

8. The method of claim 1, further comprising receiving, with at least one monitoring processor, real-time aircraft traffic data for the plurality of aircraft in the monitored airspace, wherein the real-time aircraft traffic data comprises at least one of: a call sign, a latitude and longitude, an altitude, a bearing and a speed, of at least one aircraft of the plurality of aircraft in the monitored airspace.

9. The method of claim 8, wherein the real-time aircraft traffic data comprises data broadcast from the at least one aircraft of the plurality of aircraft in the monitored airspace.

10. The method of claim 9, wherein the real-time aircraft traffic data comprises Automatic Dependent Surveillance-Broadcast (ADS-B) data.

11. The method of claim 1, further comprising determining the presence of the at least one first aircraft, the determining comprising determining a presence of a greater number of the at least one first aircraft operating on Visual Flight Rules (VFR) in the monitored airspace than a predetermined Visual Flight Rules (VFR) traffic threshold.

12. The method of claim 1, further comprising determining the presence of the at least one second aircraft, the determining comprising determining a presence of the at least one second aircraft on an Instrument Flight Rules (IFR) approach path in the monitored airspace.

13. The method of claim 1, the automatically communicating the at least one air-traffic advisory message comprising one or more of:
  (i) on the first communications frequency, automatically communicating to the at least one first aircraft a message comprising an alert regarding the at least one second aircraft in the monitored airspace being an approaching Instrument Flight Rules (IFR) aircraft, wherein the at least one first aircraft comprises one or more aircraft operating on Visual Flight Rules (VFR) in the monitored airspace; and
  (ii) on the second communications frequency, automatically communicating to the at least one second aircraft a message comprising an alert regarding the at least one first aircraft in the monitored airspace being one or more aircraft operating on Visual Flight Rules (VFR) in the monitored airspace, wherein the at least one second aircraft comprises one or more aircraft operating on Instrument Flight Rules (IFR) in the monitored airspace.

14. The method of claim 1, wherein the monitored airspace comprises a non-towered airport.

15. The method of claim 1, wherein the at least one second aircraft comprises one or more aircraft operating on Instrument Flight Rules (IFR) in the monitored airspace, in communication with Air Traffic Control (ATC) at a remote location, outside the monitored airspace.

16. The method of claim 1, the automatically communicating the at least one air-traffic advisory message comprises communicating on an air traffic frequency that is assigned for use of aircraft communications at a remote location, which is out of effective radio range of the monitored airspace, using a transmission power for the automatically communicating that is sufficiently low in power to avoid receipt of the at least one air-traffic advisory message at the remote location but sufficiently high in power to permit receipt of the at least one air-traffic advisory message in the monitored airspace.

17. The method of claim 16, wherein the air traffic frequency that is assigned for the use of aircraft communications at a remote location comprises a Common Traffic Advisory Frequency (CTAF).

18. A method of automatically communicating with a remote Air Traffic Control (ATC) location, the method comprising:

based on a flight status of at least one aircraft operating under Instrument Flight Rules (IFR) in a monitored airspace, located remotely from the Air Traffic Control (ATC) location and in which the at least one aircraft operating under Instrument Flight Rules (IFR) does not have ability to communicate with the Air Traffic Control (ATC) location, automatically communicating a message for use of the remote Air Traffic Control (ATC) indicating the flight status of the at least one aircraft operating under Instrument Flight Rules (IFR).

19. The method of claim 18, further comprising:
receiving, with at least one monitoring processor, real-time aircraft traffic data for a plurality of aircraft in the monitored airspace; and
based on at least the real-time aircraft traffic data, determining a flight status of the at least one aircraft operating under Instrument Flight Rules (IFR) in the monitored airspace and being assigned to be controlled by the remotely located Air Traffic Control (ATC) location.

20. The method of claim 18, further comprising receiving a communication of the flight status of the at least one aircraft operating under Instrument Flight Rules (IFR) in the monitored airspace and being assigned to be controlled by the remotely located Air Traffic Control (ATC) location.

21. The method of claim 20, wherein receiving the communication of the presence of the at least one aircraft operating under Instrument Flight Rules (IFR) in the monitored airspace comprises one or more of: (i) receiving a message from a cloud-based application; and (ii) receiving a message from an Aircraft Communications Addressing and Reporting System (ACARS).

22. The method of claim 18, wherein the monitored airspace comprises a non-towered airport.

23. The method of claim 18, wherein the flight status comprises at least one of: a landed status, a gone around status, a departed status, and an off-runway status.

24. The method of claim 18, further comprising at least one of transmitting a satellite message and generating an automatic telecommunications message.

25. The method of claim 18, wherein the automatically communicating comprises transmitting a message for use of at least one of Air Traffic approach control and Air Traffic departure control at the Air Traffic Control (ATC) location.

26. The method of claim 18, wherein the automatically communicating comprises transmitting a message for use of a cloud-based application.

27. A system for automatically communicating air-traffic advisory messages, the system comprising:
at least one communications processor adapted to automatically generate at least one air-traffic advisory message, based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, the at least one first aircraft and the at least one second aircraft operating on different communications frequencies, the at least one air-traffic advisory message comprising one or more of: a first message to the at least one first aircraft comprising an alert regarding the at least one second aircraft in the monitored airspace; and a second message to the at least one second aircraft comprising an alert regarding the at least one first aircraft.

28. The system of claim 27, further comprising at least one monitoring processor adapted to receive real-time aircraft traffic data for the plurality of aircraft in the monitored airspace;
the at least one monitoring processor being adapted to determine, based on at least the real-time aircraft traffic data, the presence of the at least one first aircraft of the plurality of aircraft configured for communicating on the first communications frequency;
the at least one monitoring processor being further adapted to determine, based on at least the real-time aircraft traffic data, the presence of the at least one second aircraft of the plurality of aircraft configured for communicating on the second communications frequency, different from the first communications frequency.

29. The system of claim 27, further comprising at least one monitoring processor adapted to receive a communication of the presence of the at least one first aircraft and of the presence of the at least one second aircraft.

30. The system of claim 29, wherein the at least one monitoring processor is adapted to receive the communication of the presence of the at least one first aircraft and of the presence of the at least one second aircraft by one or more of: (i) receiving a message from a cloud-based application; and (ii) receiving a message from an Aircraft Communications Addressing and Reporting System (ACARS).

31. The system of claim 27, further comprising at least one transmitter in communication with the at least one communications processor adapted to perform at least one of: (i) on the first communications frequency, automatically communicate the first message to the at least one first aircraft; and (ii) on the second communications frequency, automatically communicate the second message to the at least one second aircraft.

32. The system of claim 27, wherein the at least one first aircraft comprises an aircraft operating on Visual Flight Rules (VFR) in the monitored airspace.

33. The system of claim 27, wherein the at least one second aircraft comprises an aircraft operating on Instrument Flight Rules (IFR) in the monitored airspace.

34. The system of claim 27, further comprising a monitoring processor adapted to receive real-time aircraft traffic data for the plurality of aircraft in the monitored airspace, wherein the real-time aircraft traffic data comprises at least one of: a call sign, a latitude and longitude, an altitude, a bearing and a speed, of at least one aircraft of the plurality of aircraft in the monitored airspace.

35. The system of claim 34, wherein the real-time aircraft traffic data comprises data broadcast from the at least one aircraft of the plurality of aircraft in the monitored airspace.

36. The system of claim 35, wherein the real-time aircraft traffic data comprises Automatic Dependent Surveillance-Broadcast (ADS-B) data.

37. The system of claim 27, further comprising at least one monitoring processor adapted to determine a presence of a greater number of the at least one first aircraft operating on Visual Flight Rules (VFR) in the monitored airspace than a predetermined Visual Flight Rules (VFR) traffic threshold.

38. The system of claim 27, further comprising at least one monitoring processor adapted to determine a presence of the at least one second aircraft on an Instrument Flight Rules (IFR) approach path in the monitored airspace.

39. The system of claim 27, wherein the at least one communications processor is further adapted to generate at least one air-traffic advisory message comprising one or more of:
  (i) an alert regarding the at least one second aircraft in the monitored airspace being an approaching Instrument Flight Rules (IFR) aircraft, wherein the at least one first aircraft comprises one or more aircraft operating on Visual Flight Rules (VFR) in the monitored airspace; and
  (ii) an alert regarding the at least one first aircraft in the monitored airspace being one or more aircraft operating on Visual Flight Rules (VFR) in the monitored airspace, wherein the at least one second aircraft comprises one or more aircraft operating on Instrument Flight Rules (IFR) in the monitored airspace.

40. The system of claim 27, wherein the monitored airspace comprises a non-towered airport.

41. The system of claim 27, wherein the at least one second aircraft comprises one or more aircraft operating on Instrument Flight Rules (IFR) in the monitored airspace, in communication with Air Traffic Control (ATC) at a remote location, outside the monitored airspace.

42. The system of claim 27, further comprising at least one transmitter in communication with the at least one communications processor adapted to perform at least one of: (i) on the first communications frequency, automatically communicating the first message to the at least one first aircraft; and (ii) on the second communications frequency, automatically communicating the second message to the at least one second aircraft; and
  wherein the at least one transmitter is further adapted to communicate on an air traffic frequency that is assigned for use of aircraft communications at a remote location, which is out of effective radio range of the monitored airspace, using a transmission power for the automatically communicating that is sufficiently low in power to avoid receipt of the at least one air-traffic advisory message at the remote location but sufficiently high in power to permit receipt of the at least one air-traffic advisory message in the monitored airspace.

43. The system of claim 42, wherein the air traffic frequency that is assigned for the use of aircraft communications at a remote location comprises a Common Traffic Advisory Frequency (CTAF).

44. A system for automatically communicating with a remote Air Traffic Control (ATC) location, the system comprising:
  at least one communications processor adapted to, based on a flight status of at least one aircraft operating under Instrument Flight Rules (IFR) in a monitored airspace, located remotely from the Air Traffic Control (ATC) location and in which the at least one aircraft operating under Instrument Flight Rules (IFR) does not have ability to communicate with the Air Traffic Control (ATC) location, automatically generate a message for use of the remote Air Traffic Control (ATC) indicating the flight status of the at least one aircraft operating under Instrument Flight Rules (IFR).

45. The system of claim 44, further comprising at least one monitoring processor adapted to receive real-time aircraft traffic data for the plurality of aircraft in the monitored airspace, located remotely from the Air Traffic Control (ATC) location;
  the at least one monitoring processor adapted to, based on at least the real-time aircraft traffic data, determine the flight status of at least one aircraft operating under Instrument Flight Rules (IFR) in the monitored airspace and being assigned to be controlled by the remotely located Air Traffic Control (ATC) location.

46. The system of claim 44, further comprising at least one monitoring processor adapted to receive a communication of the flight status of the at least one aircraft operating under Instrument Flight Rules (IFR) in the monitored airspace and being assigned to be controlled by the remotely located Air Traffic Control (ATC) location.

47. The system of claim 46, wherein the at least one monitoring processor is adapted to receive the communication of the presence of the at least one aircraft operating under Instrument Flight Rules (IFR) in the monitored airspace by one or more of: (i) receiving a message from a cloud-based application; and (ii) receiving a message from an Aircraft Communications Addressing and Reporting System (ACARS).

48. The system of claim 44, further comprising a transmitter configured to communicate the message for use of the remote Air Traffic Control (ATC).

49. The system of claim 44, wherein the monitored airspace comprises a non-towered airport.

50. The system of claim 44, wherein the flight status comprises at least one of: a landed status, a gone around status, a departed status, and an off-runway status.

51. The system of claim 44, further comprising a transmitter configured to communicate the message for use of the remote Air Traffic Control (ATC), wherein the transmitter is further adapted to transmit at least one of a satellite message and an automatic telecommunications message.

52. The system of claim 51, wherein the transmitter is further adapted to transmit a message for use of at least one of Air Traffic approach control and Air Traffic departure control at the Air Traffic Control (ATC) location.

53. The system of claim 51, wherein the transmitter is further adapted to transmit a message for use of a cloud-based application.

54. A non-transitory computer-readable medium configured to store instructions for automatically communicating air-traffic advisory messages, the instructions, when loaded and executed by a processor, cause the processor to:
  automatically communicating at least one air-traffic advisory message, the automatically communicating being based at least on (i) a presence of at least one first aircraft of a plurality of aircraft in a monitored airspace, the at least one first aircraft configured for communicating on a first communications frequency, and (ii) a presence of at least one second aircraft of the plurality of aircraft in the monitored airspace, the at least one second aircraft configured for communicating on a second communications frequency, different from the first communications frequency, and the at least one first aircraft and the at least one second aircraft operating on different communications frequencies, the automatically communicating the at least one air-traffic advisory message comprising one or more of:
  (i) on the first communications frequency, automatically communicating to the at least one first aircraft a message comprising an alert regarding the at least one second aircraft in the monitored airspace; and
  (ii) on the second communications frequency, automatically communicating to the at least one second aircraft a message comprising an alert regarding the at least one first aircraft in the monitored airspace.

55. A non-transitory computer-readable medium configured to store instructions for communicating with a remote Air Traffic Control (ATC) location, the instructions, when loaded and executed by a processor, cause the processor to communicate with a remote Air Traffic Control (ATC) location by:

based on a flight status of at least one aircraft operating under Instrument Flight Rules (IFR) in a monitored airspace, located remotely from the Air Traffic Control (ATC) location and in which the at least one aircraft operating under Instrument Flight Rules (IFR) does not have ability to communicate with the Air Traffic Control (ATC) location, automatically communicating a message for use of the remote Air Traffic Control (ATC) indicating the flight status of the at least one aircraft operating under Instrument Flight Rules (IFR).

\* \* \* \* \*